(12) United States Patent
Webb et al.

(10) Patent No.: US 9,403,974 B2
(45) Date of Patent: Aug. 2, 2016

(54) CLAY/POLYMER BLEND AS HIGH PH OR IONIC LIQUID BARRIER

(71) Applicant: AMCOL INTERNATIONAL CORPORATION, Hoffman Estates, IL (US)

(72) Inventors: Nigel Webb, Rhydymwyn (GB); Dolly Batra, Wheaton, IL (US); Michael Donovan, Huntley, IL (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 18 days.

(21) Appl. No.: 14/329,855

(22) Filed: Jul. 11, 2014

(65) Prior Publication Data

US 2015/0018594 A1  Jan. 15, 2015

Related U.S. Application Data

(60) Provisional application No. 61/845,791, filed on Jul. 12, 2013.

(51) Int. Cl.

| | |
|---|---|
| C08K 3/34 | (2006.01) |
| C08L 33/26 | (2006.01) |
| C08L 79/00 | (2006.01) |
| B32B 5/22 | (2006.01) |
| E02D 31/00 | (2006.01) |
| B01J 20/12 | (2006.01) |
| B01J 20/26 | (2006.01) |
| B01J 20/28 | (2006.01) |
| C04B 28/00 | (2006.01) |
| B01J 20/10 | (2006.01) |
| C04B 111/00 | (2006.01) |

(52) U.S. Cl.
CPC ............... *C08L 33/26* (2013.01); *B01J 20/10* (2013.01); *B01J 20/12* (2013.01); *B01J 20/262* (2013.01); *B01J 20/264* (2013.01); *B01J 20/28035* (2013.01); *B32B 5/22* (2013.01); *C04B 28/001* (2013.01); *C08L 79/00* (2013.01); *E02D 31/004* (2013.01); *B01J 2220/46* (2013.01); *B32B 2255/02* (2013.01); *B32B 2255/26* (2013.01); *C04B 2111/00775* (2013.01); *Y10T 442/2918* (2015.04); *Y10T 442/667* (2015.04)

(58) Field of Classification Search
CPC ........... C08L 33/26; C08L 79/00; B32B 5/22; B32B 2255/26; B32B 2255/02; E02D 31/004
USPC .......................................... 524/445
See application file for complete search history.

(56) References Cited

U.S. PATENT DOCUMENTS

| | | | |
|---|---|---|---|
| 2,958,682 A | 11/1960 | Schuller | |
| 3,573,049 A * | 3/1971 | Kalenda | G03C 5/3053 430/434 |
| 4,012,437 A | 3/1977 | Shachat et al. | |
| 4,534,925 A | 8/1985 | Harriett | |
| 4,534,926 A | 8/1985 | Harriett | |
| 4,668,724 A | 5/1987 | Harriett | |
| 4,897,309 A | 1/1990 | Haas et al. | |
| 6,737,472 B2 | 5/2004 | Zhou et al. | |
| 7,026,385 B2 | 4/2006 | Wammes et al. | |
| 2005/0187112 A1 | 8/2005 | Goodhue et al. | |
| 2012/0219367 A1 | 8/2012 | Landis et al. | |
| 2012/0219566 A1 | 8/2012 | Medof et al. | |

FOREIGN PATENT DOCUMENTS

| | | |
|---|---|---|
| WO | WO-2009/023915 A1 | 2/2009 |
| WO | WO-2011/022134 A1 | 2/2011 |
| WO | WO-2012/025564 A1 | 3/2012 |
| WO | WO-2013/113031 A1 | 8/2013 |

OTHER PUBLICATIONS

Razakamanantsoa et al., Applied Clay Science, vol. 59, 103-114, 2012.*
International Search Report and Written Opinion, corresponding International Application No. PCT/US2014/046431, mailed Dec. 11, 2014.
Razakamanantsoa et al., Hydraulic performance of activated calcium bentonite treated by polyionic charged polymer, Appl. Clay Sci., 59:103-14 (2012).

* cited by examiner

*Primary Examiner* — Hui Chin
(74) *Attorney, Agent, or Firm* — Leon Nigohosian, Jr.

(57) ABSTRACT

A composition capable of increased impermeability against the passage of ionic liquids therethrough can include a clay mixed with an anionic and cationic polymer. Such compositions can be provided in geosynthetic liners to provide a hydraulic barrier in aggressive leachate environments.

30 Claims, 9 Drawing Sheets

CLAY/POLYMER BLEND AS HIGH PH OR IONIC LIQUID BARRIER

CROSS-REFERENCE TO RELATED APPLICATION

This application claims the benefit of U.S. Provisional Application No. 61/845,791, entitled "Blended Polymer System" which was filed on Jul. 12, 2013, the entire disclosure of which is hereby incorporated by reference herein.

FIELD OF THE DISCLOSURE

The present disclosure is directed to a mixture of clay with a combination of cationic and anionic polymers, and/or one or more monomers having both cationic and anionic charge sites, and to a method of improving the hydraulic performance (impermeability or barrier property) of the clay when the clay is used as a hydraulic barrier against flow of aggressive liquids having high ionic strengths (highly acidic and/or highly alkaline), such as mining leachates resulting from the processing of mineral ores, e.g., bauxite ores. The clay/polymer mixture preferably is used as a barrier layer in a geosynthetic clay liner (GCL) disposed between two geosynthetic fabrics. In the most preferred embodiment, the clay/polymer mixture is disposed between two geosynthetic fabrics, at least one of which is non-woven, and the fabrics are needle-punched together to lock the clay/polymer mixture between the fabrics.

BACKGROUND OF THE DISCLOSURE AND PRIOR ART

There is a clear need in industry for improved waste liquid containment in many industries that chemically treat materials and, as a by-product of the treatment process, produce aggressive liquids which need to be contained in reservoirs. These aggressive (highly acidic or highly alkaline) liquids or liquid/solid waste materials cannot be disposed of by burial because they might permeate through soil and contaminate ground water supplies, and therefore, must be contained by placing a liquid barrier beneath the waste to prevent the waste from permeating the barrier. Particularly troublesome are waste materials that are strongly alkaline liquids, such as those resulting from the processing of mineral ores, particularly bauxite ores.

Geosynthetic clay liners, for the most part, have been found to provide less than adequate barrier (hydraulic performance) to high pH (alkaline) waste liquids containing high concentrations of ionic salts, particularly in the mineral ore processing industries.

Previous attempts to provide clay with improved hydraulic performance against permeation of highly ionic waste liquids have included the addition of a silica component containing free silica or a siliceous material to protect the clay from dissolution (WO 2009/023915); adding an anionic polymer solution to the clay, followed by drying (WO 2012/025564 and U.S. Pat. No. 7,026,385; US 2012/0219566 A1 and 2012/0219367 A1); and polymerizing polymers, in-situ, using a blend of clay and monomers, within the confines of a GCL (U.S. Pat. No. 6,737,472 B2).

SUMMARY

It has been discovered, in accordance with a preferred embodiment of the compositions, articles of manufacture, and methods described and claimed herein, that clay mixed with a combination of cationic and anionic polymers, and one or more monomers having both cationic and anionic charge sites, results in a composition that has surprising hydraulic performance (impermeability) against the hydraulic conductivity of highly ionic waste liquids, such as bauxite ore leachate and other mineral ore processing leachates. In the preferred embodiment, the clay/cationic polymer/anionic polymer mixture is contained in a geosynthetic clay liner (GCL). Surprisingly, when the clay/polymer mixture is disposed between two fabrics, at least one of which is non-woven, and the fabrics are needle-punched together, the polymer combination, via interactions between the two polymers, or between polymer(s) and clay, will block the liquid from permeating the fabric, and even blocks liquid permeation through needle-punch holes in the fabrics. This is a particularly surprising since the clay portion, by itself, will not swell materially when contacted with the highly ionic, aggressive waste liquid. The polymers and/or monomer(s) can be homogeneously mixed with the clay in any manner, preferably by dry blending, milling, and/or extrusion.

Without being bound to any particularly theory, it is theorized that exposure of the clay/polymer mixture to aggressive, highly ionic waste liquids, e.g., mineral ore processing leachates, allows the cationic and anionic polymers to solvate in the interstitial spaces between adjacent clay granules and the fibers of the textile fabrics. It is further believed that the polymers may complex to form flocs due to a strong attraction between the cationic and anionic polymer chains. These flocs would drain into the interstitial spaces between clay particles, and between the clay particles and the fabric fibers, to cause physical blocking of any waste liquid flow path through the geotextile, since very little swelling pressure can be attributed to the clay portion of the mixture when contacted by a highly ionic, aggressive liquid waste. Additionally physical blocking of liquid flow paths through the GCL due to the attraction of polycations to the negative charge of montmorillonite clay, forming a polycation/clay association can aid in polymer retention and may influence the mechanical properties, e.g., physical site of cationic polymer/anionic polymer flocs that block potential liquid flow paths through the GCL. Additionally, it is believed that high salt concentrations in the aggressive waste liquid may promote interactions between one or both of the polymers and the clay platelets through hydrogen bonding.

It is surprising that these associations can occur despite the presence of high salt concentrations, which are known to disrupt inter-polymer complexes. It is also surprising that these cationic/anionic polymer blends tend to exhibit better long term performance than GCLs containing just an anionic polymer component. It is further surprising that the cationic/anionic polymer blends are so efficient at blocking flow, at relatively low polymer loading, in the fiber bundles of the needle-punches. It is believed that the polymers are better retained in the GCL, through unexpected interactions between the clay and polymers, to allow for better long term stability compared to single polymer systems.

In another embodiment of the compositions, articles of manufacture, and methods described and claimed herein, the clay is mixed with a small molecule (a molecule that is not a polymer) containing both anionic and cationic spaced charges on a single small molecule, e.g., zwitterions (inner salts) that dissociate into both anionic molecules, e.g., sulfo, carboxy, or phosphor anions, and cationic molecules, e.g., quaternary ammonium, or phosphine cations, when in contact with highly ionic liquids. It is theorized that the small molecules, having both anionic and cationic spaced charges, when mixed with clay, act to provide excellent hydraulic impermeability in the same manner, and based on the same theories, as the anionic and cationic polymers described above.

In yet another embodiment of the compositions, articles of manufacture, and methods described and claimed herein, clay is mixed with one or more polymers that have both anionic and cationic spaced charges on the same polymer molecule, e.g., polybetaines and/or polyphosphine oxides. Again, it is theorized that the single polymer molecules that contain both anionic and cationic spaced charges somehow will interact with other polymer molecules having both anionic and cationic charge sites, and/or interact with the clay, to block potential liquid flow paths for highly ionic liquids.

In still another embodiment of the compositions, articles of manufacture, and methods described and claimed herein, clay is mixed with one or more polyampholytes having a negative to positive charge balance in the range of 5 to 1 to about 1 to 5, preferably about 3 to 1 to about 1 to 3, and most preferably having a perfect charge balance of 1 to 1. Preferably, the polyampholyte polymers are copolymers of a carboxylate, sulfonate or phosphate anionic polymer and a cationic polymer, each in amounts sufficient to provide the proper charge balance.

One aspect of the compositions, articles and methods described herein is to provide a clay/polymer composition that is capable of providing a barrier to the passage of highly ionic liquids, such as mineral ore leachates, thereby acting as an essentially impermeable barrier to prevent the highly ionic liquid from penetrating the composition and reaching ground water supplies.

Another aspect of the compositions, articles and methods described herein is to provide a clay/dual charge monomer blend, having a positive to negative change balance of 7 to 1 to 1 to 0.15, preferably about 1 to 1, that is capable of providing a barrier to the passage of highly ionic liquids, such as mineral ore leachates, thereby acting as an essentially impermeable barrier to prevent the highly ionic liquid from penetrating the composition and reaching ground water supplies. The monomer(s) are included with the clay in an amount of about 0.2 wt. % to about 20 wt. %, preferably about 5 wt. % to about 15 wt. %, based on the total weight of the composition.

The above and other aspects and advantages of the clay/polymer or clay/monomer blends for forming a liquid barrier to the passage of ionic and high pH liquids therethrough will become more apparent from the following detailed description.

BRIEF DESCRIPTION OF THE DRAWINGS

FIG. 2 is a schematic flow diagram of the manufacturing process for the ionic liquid barrier of the present disclosure;

DETAILED DESCRIPTION

Figure 1:
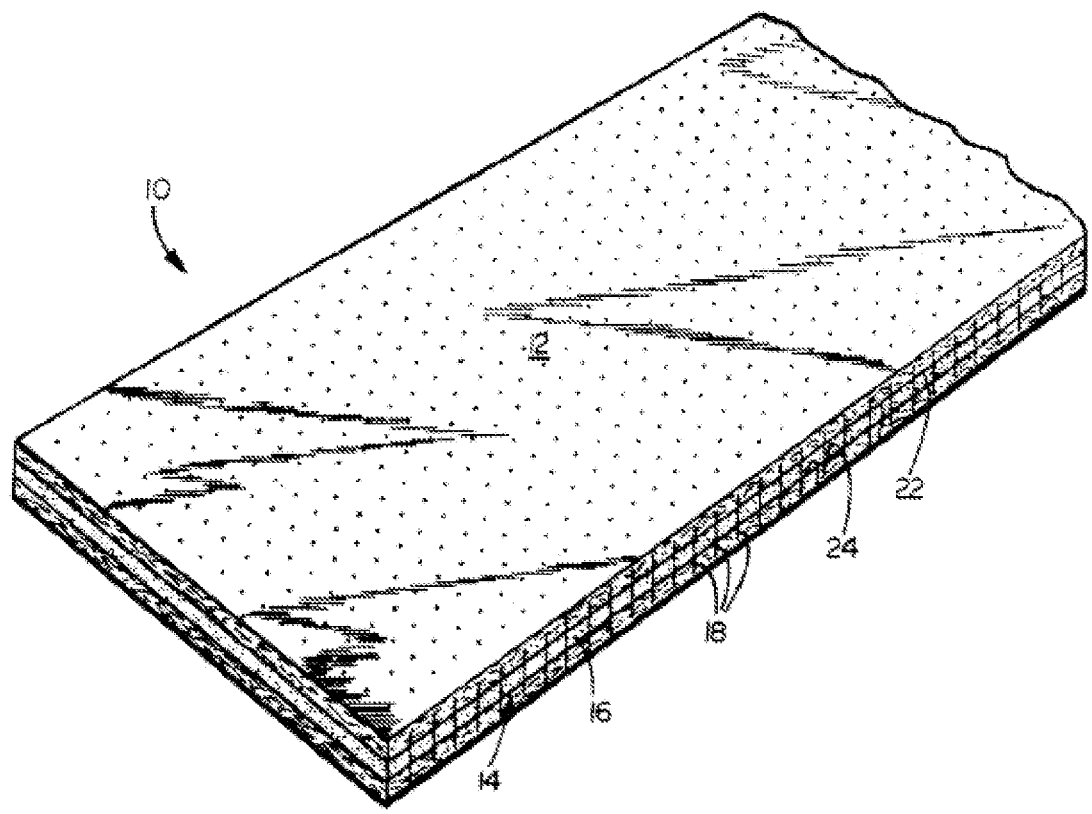
FIG. 1 is a partially broken-away perspective view of the multi-layer ionic liquid barrier of the preferred embodiment of the present disclosure.

The clay/cationic polymer/anionic polymer mixtures, in accordance with the preferred embodiment, useful to prevent highly ionic, aggressive waste liquids from permeating a GCL also are useful in preventing the waste liquids from permeating soils when used as compacted clay liners (without geotextiles) for containment of highly ionic waste liquids, e.g., mineral ore leachates. Similarly, the clay/multi-charged single polymer and small molecule mixtures described herein also are useful in preventing waste liquid permeation through a GCL and in the construction of encasement structures made from compacted clay; slit trenches and cut-off walls formed from slurries of the clay/polymer mixtures. The clay/cationic polymer/anionic polymer mixture as well as the clay/multi-charged single polymer and small molecule mixtures described herein also are useful as the clay component in any liquid barrier device and/or method. The preferred form of use is clay/anionic/cationic/polymer mixtures contained between two needle-punched textiles.

As used herein "aggressive environment" or "aggressive liquids" refers to a system in which water absorption, retention or containment is desired, having a high or low pH, a high ionic strength, and a high concentration of divalent and/or multivalent ions. For example, aggressive environments can include water systems having high pH, for example, a pH of 10 or greater, or have low pH, for example, a pH of 3 or less. Aggressive environments can alternatively or additionally have a high ionic strength, for example, an ionic strength greater than 10 mol dm$^{-3}$. The ionic strength (I), expressed as mol dm$^{-3}$, is a function of the concentration of all ions present in that solution and is calculated by Formula 1, below:

$$I = \frac{1}{2}\sum C_i Z_i^2, \qquad \text{Formula 1}$$

wherein $C_i$ is a molar concentration of $i^{th}$ ion present in the solution and $z_i$ is its charge.

Aggressive environments can alternatively or additionally have high concentrations of divalent and/or multivalent ions, for example, as defined by an RMD value. The RMD value is the ratio of monovalent to divalent (or multivalent ions). The RMD of the solution, expressed as the square route molarity, can be calculated by the equation below, where $M_M$ and $M_D$ are the total molarity of monovalent and divalent cations in the solution respectively. The RMD of the solution, expressed as the square route molarity, can be calculated by Formula 2, below:

$$RMD = \frac{M_M}{\sqrt{M_D}}, \quad \text{Formula 2}$$

wherein $M_M$ and $M_D$ are the total molarity of monovalent and divalent cations in the solution respectively. Aggressive environments have low RMD values, for example, less than 0.7, especially less than 0.5 and particularly less than 0.1. Divalent and other multivalent ions bridge the platelets of a clay, preventing the clay from swelling and forming a hydraulic barrier. Thus, in environments having low RMD values, clay-only barriers cannot properly function without prehydration to swell the clay. Should the clay eventually dry out during use, the barrier would become significantly more permeable and the clay would not reswell due to the effects of the water having a high concentration of divalent or multivalent ions.

In some embodiments, the aggressive environment includes high concentrations of calcium chloride, for example, calcium chloride concentrations of 50 mmol or greater. The aggressive environment can have a calcium chloride concentration, for example, of 50 mmol or greater, 100 mmol or greater, 150 mmol or greater, 200 mmol or greater, 250 mmol or greater, 300 mmol or greater, 350 mmol or greater, 400 mmol or greater, 450 mmol or greater, and 500 mmol or greater. For example, municipal solid waste (MSW) presents an aggressive environment to clay-based barriers in that it generally has an ionic strength of about 100 mM. Low level radioactive waste (LLRW) also presents an aggressive environment to clay-based barriers as it has an RMD value of less than 0.5. Coal Combustion Products (CCP) is yet another aggressive environment for clay-based barriers, having high ionic strength and low RMD values. CCP ash generally includes mixed coal combustion ash and would be expected to generate a different anticipate leachate in the long term storage process depending on the site from which it was produced. Flue gas desulfurization (FGD) is yet another type of aggressive leachate that includes ash generated from the injection of calcium hydroxide into the flue gas stream. As demonstrated below, FGD leachate characteristics including ionic strength can vary significantly depending on the site from which it was produced. Trona ash is another type of aggressive leachate, which results from injection of trona into a flue gas stream. Hydrofracture water is an example of an aggressive environment having high ionic strength. Fly ash is yet another aggressive leachate, which includes ash isolated from the particulate collectors. For example, the hydraulic barriers of the disclosure can be used as barrier for mining leachates, which can include, for example, calcium chloride, hydrochloric acid, sulfuric acid, cyanide salts, and can be caustic for example, sodium hydroxide. In an embodiment, the hydraulic barriers of the disclosure can be used as a barrier for an ionic leachate having a concentration of sulfate ions of greater than 1000 mg/L.

It has been discovered, in accordance with a preferred embodiment of the compositions, articles of manufacture, and methods described and claimed herein, that clay mixed with a combination of cationic and anionic polymers, and/or mixed with one or polymers containing one or more monomers having both cationic and anionic charge sites, results in a composition that has surprising hydraulic performance (impermeability) against the hydraulic conductivity of highly ionic waste liquids, such as bauxite ore leachate and other mineral ore processing leachates. In the preferred embodiment, the clay/cationic polymer/anionic polymer mixture is contained in a geosynthetic clay liner (GCL). Surprisingly, when the clay/polymer mixture is disposed between two fabrics, at least one of which is non-woven, and the fabrics are needle-punched together, the polymer combination, via interactions between the two polymers, or between polymer(s) and clay, will block the liquid from permeating the fabric, and even blocks liquid permeation through needle-punch holes in the fabrics. This is a particularly surprising since the clay portion, by itself, will not swell materially when contacted with the highly ionic, aggressive waste liquid. The polymers and/or monomer(s) can be homogeneously mixed with the clay in any manner, preferably by dry blending, milling, and/or extrusion.

Without being bound to any particularly theory, it is theorized that exposure of the clay/polymer mixture to aggressive, highly ionic waste liquids, e.g., mineral ore processing leachates, allows the cationic and anionic charge sites on the polymers to solvate in the interstitial spaces between adjacent clay granules and the fibers of the textile fabrics. Another theory is that the polymers may complex to form flocs due to a strong attraction between the cationic and anionic polymer chains. These flocs would drain into the interstitial spaces between clay particles, and between the clay particles and the fabric fibers, to cause physical blocking of any waste liquid flow path through the geotextile, since very little swelling pressure can be attributed to the clay portion of the mixture when contacted by a highly ionic, aggressive liquid waste. Another potential mechanism for the surprising results described herein, is a physical blocking of liquid flow paths through the GCL due to the attraction of polycations to the negative charge of montmorillonite clay, forming a polycation/clay association that aids in polymer retention and may influence the mechanical properties, e.g., physical site of cationic polymer/anionic polymer flocs that block potential liquid flow paths through the GCL. As a final theory, high salt concentrations in the aggressive waste liquid may promote interactions between one or both of the polymers and the clay platelets through hydrogen bonding.

It is surprising that these associations can occur despite the presence of high salt concentrations, which are known to disrupt inter-polymer complexes. It is also surprising that these cationic/anionic polymer blends tend to exhibit better long term performance than GCLs containing just an anionic polymer component. It is further surprising that the cationic/anionic polymer blends are so efficient at blocking flow, at relatively low polymer loading, in the fiber bundles of the needle-punches. We theorize that the polymers are better retained in the GCL, through unexpected interactions between the clay and polymers, to allow for better long term stability compared to single polymer systems.

It has also been advantageously discovered that the clay/polymer compositions in accordance with embodiments of the disclosure hydrate to a given moisture content when exposed to a given aggressive leachate. It has been advantageously discovered that good hydraulic barrier performance can be achieved when the clay/polymer compositions hydrate to a moisture content of about 60 parts to about 120 parts per 100 parts composition or about 60 parts to about 90 parts per 100 parts composition, or about 70 parts to about 90 parts per 100 parts of the composition. Other suitable moisture contents include about 60, 70, 80, 90, 100, 110, and 120 parts per 100 parts of the composition. As such hydration levels, it is believed that the clay/polymer composition forms a gel that effectively provides a barrier to passage of the leachate. It is further believed that at moisture contents below about 60 parts per 100 parts composition, there is an ineffective amount of gel formation, and at moisture contents above 120 parts per 100 parts composition, the composition is no longer in a gel form. Such hydration within the 60 parts to 120 parts per 100 parts composition moisture content range is achievable with the compositions in accordance with the disclosure in aggressive leachates, such as those disclosed herein. Incorporation of the clay/polymer compositions into a needle-punched geosynthetic liner can limit the hydration of the clay/polymer composition to be within the range of about 60 parts to about 90 parts per 100 parts composition due pressure from waste present on the liner as well as the hydrostatic pressure of the leachate. The clay/polymer systems in accordance with the disclosure can effective gel at moisture contents of about 60 parts to about 90 parts per 100 parts composition.

Some embodiments are methods of providing an essentially ionic liquid-impermeable barrier below an ionic liquid to prevent the ionic liquid from reaching ground water supplies below said barrier comprising disposing the article of manufacture described herein under and in contact with an ionic liquid such that the article of manufacture has an impermeability to said ionic liquid with a maximum hydraulic conductivity of $1 \times 10^{-7}$ cm/sec. Some embodiments are methods of providing an essentially ionic liquid-impermeable barrier below an ionic liquid to prevent the ionic liquid from reaching ground water supplies below said barrier comprising disposing the article of manufacture described herein under and in contact with an ionic liquid such that the article of manufacture has an impermeability to said ionic liquid with a maximum hydraulic conductivity of $1 \times 10^{-8}$ cm/sec. Some embodiments are methods of providing an essentially ionic liquid-impermeable barrier below an ionic liquid to prevent the ionic liquid from reaching ground water supplies below said barrier comprising disposing the article of manufacture described herein under and in contact with an ionic liquid such that the article of manufacture has an impermeability to said ionic liquid with a maximum hydraulic conductivity of $5 \times 10^{-9}$ cm/sec. In some embodiments, the ionic liquid has a pH of about 5 to about 13, or the ionic liquid has a pH of about 9 to about 13. In some embodiments, the ionic liquid is a mineral ore leachate, bauxite ore leachate, coal combustion product leachate, or a flue gas desulfurization residual leachate. In some embodiments, the ionic liquid is a leachate having a concentration of sulfate ions greater than 1000 mg/L. Embodiments also include a leachate containment system including a bottom surface, an article of manufacture described herein disposed adjacent to the bottom surface, and a leachate disposed on the article, wherein the article has an impermeability to the leachate with a maximum hydraulic conductivity of $1 \times 10^{-8}$ cm/sec. In some embodiments, the composition of the article of manufacture in the leachate containment system forms a gel upon absorption of moisture from the leachate to a moisture content of 70 parts to 90 parts per 100 parts of composition.

Clays

The preferred clay is a smectite or montmorillonite, e.g., bentonite clay that swells when contacted by water. Although there is little swelling of these clays when contacted by highly ionic waste liquids, it has been found that the little swelling that occurs produces better impermeability results than other clays. However, since clay swelling is not a major contributor to impermeability, other clays can be used instead of, or in addition to the smectites or montmorillonites. Other suitable clays include vermiculites and non-smectite clays, such as kaolin, illite, attapulgite and sepiolite (including synthetic analogs of each). Naturally occurring sodium bentonite clay having sodium as the predominant exchangeable cation is preferred.

Preferably, the clay particles should be a size that provides a range of particles sizes, enabling smaller particles to fit between larger particles to narrow any fluid passages through the clay polymer mixture upon contact with a highly ionic waste liquid. The clay can be in a granular or powdered form. In the most preferred embodiment, the clay particles should have a particle size of less than about 2 mm, with about 40% to about 70% of the particles having a size of larger than about 1.4 mm to less than about 2.0 mm; about 10% to about 30% of the particles having a size of larger than 1.0 mm and less than 1.4 mm; about 10% to about 30% of the particles having a size larger than 0.5 mm and less than 1.0 mm; and less than 5% of the particles having a size smaller than 0.5 mm. Alternatively, the clay can be in powder form, wherein all particles have a size less than about 25 mm. The clay may be from 60 to 99.6 wt. % of the composition or from 80 to 99.6 wt. % of the composition.

Polymers

The following cationic and anionic polymers can be linear or branched, or cross-linked and can have various molecular weights as described below. As used herein, the term "low molecular weight" generally refers to a molecular weight of about $1 \times 10^4$ Da to $3 \times 10^6$ Da. As used herein, the term "medium molecular weight" generally refers to a molecular weight of greater than $3 \times 10^6$ Da to $6 \times 10^6$ Da. As used herein, the term "medium-high molecular weight" generally refers to a molecular weight of greater than $6 \times 10^6$ Da to about $10 \times 10^6$ Da. As used herein, the term "high molecular weight" generally refers to a molecular weight of greater than $10 \times 10^6$ Da to about $15 \times 10^6$ Da. As used herein, the term "very high molecular weight" generally refers to a molecular weight greater than $15 \times 10^6$ Da (e.g. up to about 100 million Dalton).

The charge on the polymers, expressed as milliequivalents per gram (meq/g) can range from about 0.5 meq/g to about 20 meq/g, preferably from about 1.0 meq/g to about 15 meq/g, more preferably about 1.0 to about 10 meq/g.

As used herein, the term "low percent charge" refers to a charge percentage of less than about 10%. As used herein, the term "medium percent charge" refers to a charge percentage of about 15% to about 30%. As used herein, the term "medium-high percent charge" refers to a charge percentage of greater than about 30% to about 60%. As used herein, the term "high percent charge" refers to a charge percentage of greater than about 60% to about 90%. As used herein, the term "very high percent charge" refers to a charge percentage greater than about 90%.

The ratio of the charge of the polymers (anionic to cationic) can range from about 0.15:1 to about 7:1, about 0.3:1 to about 6:1, about 1:1 to about 5:1, about 1:2 to about 4:1, about 1:3 to about 3:1, about 1:2 to about 2:1 (anionic:cationic). Other suitable ratios include, for example, about 0.15:1, 0.2:1, 0.3:1, 0.4:1, 0.5:1, 0.6:1, 0.7:1, 0.8:1, 0.9:1, 1:1, 2:1, 3:1, 4:1, 5:1, 6:1, and 7:1. In some embodiments the ratio of the charge of the polymers (anionic to cationic) is in the range from of about 2:4 to 1:1.

In accordance with various embodiments of the disclosure, the clay/polymers systems can include the polymer component (e.g. the combination of cationic and anionic polymer) in an amount of about 0.4% to about 20% by weight based on the total weight of the composition. Other suitable amounts based on the total weight of the composition, include, about 0.5 wt % to about 20 wt %, about 1 wt % to about 20 wt %, about 5 wt % to about 10 wt %, about 10 wt % to about 20 wt %, about 1 wt % to about 5 wt %, about 2 wt % to about 4 wt %, about 3 wt % to about 6 wt %, and about 1 wt % to about 4 wt %. For example, the polymer can be included in a weight percent of about 1, 1.5, 2, 2.5, 3, 3.5, 4, 4.5, 5, 5.5, and 6 wt % based on the total weight of the composition.

The following are examples of cationic polymers that can be used in the clay/polymer systems for interpolymer complexes. The systems can include one or more cationic polymers. The cationic polymer(s) can be included in an amount of about 0.2 wt. % to about 20 wt. % based on the total weight of the composition. Other suitable amounts, based on the total weight of the composition, include about 0.5 wt. % to about 15 wt %, about 1 wt % to about 10 wt %, and about 2 wt % to about 6 wt %. Other suitable amounts include, but are not limited to 0.2, 0.4, 0.6, 0.8, 1, 2, 3, 4, 5, 6, 7, 8, 9, 10, 11, 12, 13, 14, 15, 16, 17, 18, 19, and 20 wt % based on the total weight of the composition.

Polymethacrylamidopropyltrimonium chloride
Polyethylenimine:
Polymethacrylamidopropyl trimethylammonium cation
Dimethylamine epichlorohydrin copolymer
Poly(2-acryloyloxyethyl)trimethylammonium cation
Quaternized copolymer of vinyl pyrrolidone, methacrylamide, vinyl imidazole and quaternized vinyl imidazole (Polyquaternium 68)
1-Dodecanaminium, N,N-dimethyl-N-[3-[(2-methyl-1-oxo-2-propenyl)amino]propyl]-, chloride, polymer with N-[3-(dimethylamino)propyl]-2-methyl-2-propenamide and 1-ethenyl-2-pyrrolidinone (Polyquaternium 51)
3,5,8-trioxa-4-phosphaundec-10-en-1-aminum, 4-hydroxy-N,N,N,10-tetramethyl-9-oxo-, inner salt, 4-oxide, polymer with butyl 2-methyl-2-propenoate (Polyquaternium 51)
1H-Imidazolium, 1-ethenyl-3-methyl sulphate, polymer with 1-ethenylhexahydro-2H-azepin-2-one and 1-ethenyl-2-pyrrolidinone (Polyquaternium 46)
Quaternary ammonium salt of the copolymer of vinyl pyrrolidone and quaternized imidazoline (Polyquaternium 44)
2-Propen-1-aminium, N,N-dimethyl-N-2-propenyl-, chloride, polymer with 2-propenamide and 2-propenoic acid (Polyquaternium 39)
Homopolymer of methacryloyltrimethylchloride (Polyquaternium 37)
Polyquaternium 35 CAS #189767-69-9
2-Propenoic acid, 2-methyl-, 2-(dimethylamino)ethyl ester, polymer with methyl 2-methyl-2-propenoate, compd. with dimethylsulfate (Polyquaternium 35)
1,3-propanediamine, N,N-diethyl-N',N'-dimethyl-, polymer with 1,3-dibromopropane (Polyquaternium 34)
N,N,N-Trimethyl-2-[(1-oxo-2-propenyl)oxy]ethanaminium chloride polymer: (POLYQUATERNIUM 33)
Poly(acrylamide 2-methacryloxyethyltrimethyl ammonium chloride) (POLYQUATERNIUM 32)
Copolymers of dimethyaminopropylacrylate (DMAPA), acrylic acid and acrylonitrogens and diethyl sulfate (Polyquaternium 31)
Polyacrylamide ethyl trimethylammonium cation-chloride: (POLYQUATERNIUM 30)
Chitosan quaternized with epichlorohydrin (Polyquaternium 29)
Polymethacrylate amidopropyl/trimethylammonium chloride: (Polyquaternium 28)
Block copolymer from the reaction of polyquaternium-2 with polyquaternium-17 (Polyquaternium 27)
Hydroxyethyl cellulose reacted with a lauryl dimethyl ammonium substituted epoxide: (Polyquaternium 24)
Quaternized copolymer of vinylpyrrolidone and dimethylaminoethyl methacrylate (Polyquaternium 23)
Dimethyl diallyl ammonium chloride (Polyquaternium 22)
Polysiloxane/polydimethyldialkylammonium acetate copolymer (Polyquaternium 21)
Polyvinyl octadecyl ether with 2,3-epoxypropylamine (Polyquaternium 20)
Polyvinyl alcohol with 2,3-epoxypropylamine: (Polyquaternium 19)
Poly[oxy-1,2-ethanediyl(dimethyliminio)-1,3-propanediylimino(1,6-dioxo-1,6-hexanediyl)imino-1,3-propanediyl(dimethliminio)-1,2-ethanediyl dichloride]; (Polyquaternium 18)
Reaction of adipic acid and dimethylaminopropylamine, reacted with dichloroethylether (Polyquaternium 17)
Quaternized vinyl imidazole polymers (Polyquaternium 15, 16)
Ethanaminium, N,N,N-Trimethyl-2-[(2-Methyl-1-Oxo-2-Propenyl)Oxy]-, MethylSulfate, polymers (Polyquaternium 14)
Diethylaminoethyl methacrylate polymers (Polyquaternium 13)
Quaternized poly(vinylpyrrolidone/dimethylaminoethyl arylate); (Polyquaternium 12)
Quaternized poly(vinylpyrrolidone/dimethylaminoethyl arylate) (Polyquaternium 11)
Quaternary ammonium salt of hydroxyethyl cellulose reacted with a trimethyl ammonium substituted epoxide) (Polyquaternium-10)
Quaternized dimethylaminoethyl methacrylate polymers (Polyquaternium 9)
2-Propenoic acid, 2-methyl-, 2-(dimethylamino)ethyl ester, polymer with methyl 2-methyl-2-propenoate and octadecyl 2-methyl-2-propenoate, compd. with dimethyl sulfate (Polyquaternium 8)
N,N-dimethyl-N-2-propen-1-ammonium chloride polymers (Polyquaternium 6, 7)
Beta-methacrylyloxyethyl trimethyl ammonium methosulfate polymers with 2-propenamide (Polyquaternium 5)
Hydroxyethylcellulose and diallyldimethyl ammonium chloride (Polyquaternium 4)
Copolymer of acrylamide and trimethylammoniumethyl methacrylate methosulfate (Polyquaternium 3)
Urea, N,N-bis[3-(dimethylamino)propyl]-, polymer with 1,1'oxybis(2-chloroethane) (Polyquaternium-2)
Ethanol, 2,2',2"-nitrilotris-, polymer with 1,4-dichloro-2-butene and N,N,N',N-tetramethyl-2-butene-1,4-diamine (Polyquaternium-1)

The systems can include one or more anionic polymers. The anionic polymer(s) can be included in an amount of about 0.2 wt. % to about 20 wt. % based on the total weight of the composition. Other suitable amounts, based on the total weight of the composition, include about 0.5 wt. % to about 15 wt %, about 1 wt % to about 10 wt %, and about 2 wt % to about 6 wt %. Other suitable amounts include, but are not limited to 0.2, 0.4, 0.6, 0.8, 1, 2, 3, 4, 5, 6, 7, 8, 9, 10, 11, 12, 13, 14, 15, 16, 17, 18, 19, and 20 wt % based on the total weight of the composition.

Anionic polymers for interpoylmer complexes can include any of the following monomers, polymerized individually, or copolymerized with any other listed monomer:

Acrylate Based Anionic Monomers for Polymerization or Copolymerization:
  a. Carboxylate:
    i. Sodium acrylate based (co)polymers
    ii. Sodium methacrylate based (co)polymers
    iii. Malonic acid, sodium salt iv. Maleic anhydride based copolymers
v. 2-Propenoic acid, carboxymethyl ester sodium salt
vi. 2-Propenoic acid, 2-methyl-, carboxymethyl ester, sodium salt
b. Sulfonate:
i. Poly 2-Propenoic acid, sulfomethyl ester, sodium salt
ii. Poly 2-Propenoic acid, 2-methyl-, sulfomethyl ester, sodium salt
iii. Poly 2-Propenoic acid, 1-sulfopropyl ester, sodium salt
iv. Poly(2-Propenoic acid, 2-methyl-, 1-sulfoethyl ester, sodium salt
v. 2-Propenoic acid, 1-methyl-1-sulfoethyl ester, sodium salt
vi. 2-Propenoic acid, 2-methyl-, 1-methyl-1-sulfoethyl ester, sodium salt Acrylamide Based Anionic Monomers for Polymerization or Copolymerization:
  a. Poly(2-acrylamido-2-methyl-1-propanesulfonic acid, sodium salt (PolyAMPS) based (co)polymers
  b. Polysodium 3-acrylamido-3-methylbutanoate, sodium salt (PolyAMBA) based (co)polymer Polystyrene Based Anionic Monomers for Polymerization or Copolymerization:
  a. Polystyrene sulfonate (co)polymers
  b. Benzoic acid, 4-ethenyl-, sodium salt Comonomers for the polymers above with neutral monomers, such as:
  a. Acrylamide
  b. Methacrylamide
  c. Vinylalcohol
  d. Vinylpyrrolidone
  e. Alcohol-modified acrylate monomers The following are examples of small molecules (monomers) having anionic and cationic spaced charge sites that can be polymerized or copolymerized with another monomer to function as a combination cationic and anionic polymer in the clay/polymer systems of the disclosure. Alternatively, these small molecules can be used in combination with an anionic and/or cationic polymer. The small molecules can be present in an amount of about 0.2 wt. % to about 20 wt. % based on the total weight of the composition. Other suitable amounts, based on the total weight of the composition, include about 0.5 wt. % to about 15 wt %, about 1 wt % to about 10 wt %, about 10 wt % to about 15 wt %, about 5 wt % to about 15 wt %, and about 2 wt % to about 6 wt %. Other suitable amounts include, but are not limited to 0.2, 0.4, 0.6, 0.8, 1, 2, 3, 4, 5, 6, 7, 8, 9, 10, 11, 12, 13, 14, 15, 16, 17, 18, 19, and 20 wt % based on the total weight of the composition. Preferably, the monomer has a ratio of anionic to cationic charge of 1:2 to 2:1, more preferably 1:1, such that the small molecules are essentially charge balanced.
  a. zwitterion (inner salts):
    i. Betaines (quaternary-ammonium cation)
      1. Sulfobetaine
      2. Carboxybetaine
      3. Phosphobetaine
    ii. Phosphine oxides (Phosphine cation)
      1. Sulfo-phosphine
      2. Carboxy-phosphine
      3. Phospho-phosphine The monomers employed in one embodiment of this disclosure (used individually or together with other anionic/cationic polymers and/or with other anionic and/or cationic monomers) are compounds which contain both a negatively and a positively charged atom in each molecule. The preferred Zwitterions are also sometimes referred to as inner salts. These Zwitterions can be represented generically as compounds having the formula $C^{\oplus}$—B-$A^{\ominus}$, wherein $C^{\oplus}$ represents an organic cationic residue and B-$A^{\ominus}$ represents the covalently bound anionic part of the molecule in which $A^{\ominus}$ can be an anionic acid residue such as, for example, carboxylate (—$CO_2^{\ominus}$), sulfonate (—$SO_3^{\ominus}$), sulfate (—$OSO_3^{\ominus}$), and the like. The zwitterions can be used in the form of adducts with protonic acids.

Typical zwitterionic compounds which are useful in this disclosure include betaines and polybetaines such as:
(10-carboxydecyl)dimethyldodecylammonium hydroxide, inner salt,
(2-carboxy-1-butyl)dimethyldodecylammonium hydroxide, inner salt,
(2-carboxyethyl)dimethyldodecylammonium hydroxide, inner salt,
(2-carboxymethyl)dimethyldodecylammonium hydroxide, inner salt,
(3-sulfopropyl)dimethyldodecylammonium hydroxide, inner salt,
(4-sulfobutyl)dimethyldodecylammonium hydroxide, inner salt,
(3-sulfobutyl)dimethyldodecylammonium hydroxide, inner salt,
(3-sulfopropyl)diethyldodecylammonium hydroxide, inner salt,
(4-sulfobutyl)diethyldodecylammonium hydroxide, inner salt,
(2-carboxyethyl)dimethyloctadecylammonium hydroxide, inner salt,
(carboxymethyl)dimethyloctadecylammonium hydroxide, inner salt,
(3-sulfopropyl)dimethyloctadecylammonium hydroxide, inner salt,
pyridinium betaines, such as:
1-(1-carboxytridecyl)pyridinium hydroxide, inner salt,
1-(1-carboxyundecyl)pyridinium hydroxide, inner salt,
1-(10-carboxydecyl)pyridinium hydroxide, inner salt,
1-(10-sulfatodecyl)pyridinium hydroxide, inner salt,
3-carbethoxy-1-(10-carboxydecyl)pyridinium hydroxide, inner salt,
1-(17-carboxy-6-oxo-7-azaheptadecyl)pyridinium hydroxide, inner salt,
3-carboxy-1-dodecylpyridinium hydroxide, inner salt,
3-(1-Pyridinio)-1-propanesulfonate,
thetins, such as:
(1-carboxyethyl)methyldodecylsulfonium hydroxide, inner salt,
(2-carboxyethyl)methyldodecylsulfonium hydroxide, inner salt,
(3-sulfopropyl)methyldodecylsulfonium hydroxide, inner salt,
(2-carboxyethyl)methylhexadecylsulfonium hydroxide, inner salt,
(1-carboxyethyl)methylhexadecylsulfonium hydroxide, inner salt,
(2-carboxy-1-butyl)methyldodecylsulfonium hydroxide, inner salt,
(10-carboxydecyl)tetrahydrothiophenium hydroxide, inner salt,
and the like.

A preferred class of zwitterionic compounds useful in the practice of this disclosure are the sulfobetaines. Sulfobetaines are zwitterionic compounds which have a positively charged nitrogen atom and have a sulfonate group (—$SO_3^{\oplus}$) in the covalently bound anionic part of the molecule. Sulfobetaines can be generally represented by the following formula:

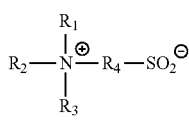

wherein $R_1$, $R_2$ and $R_3$ can be unsubstituted or substituted alkyl or aryl groups, such as methyl, ethyl, propyl, 2-methylpropyl, decyl, hexadecyl, hydroxyethyl, benzyl, and the like, and phenyl, naphthyl, tolyl and the like; and two or more of the groups $R_1$, $R_2$ or $R_3$ can be taken together to form a heterocyclic ring having one or more hetero atoms; $R_4$ is an unsubstituted or substituted alkyl chain containing one or more carbon atoms, such as a methyl, ethyl, pentyl, 2-methylpropyl and decyl chain and the like.

Typical sulfobetaines useful in this disclosure include:
(3-sulfopropyl)dimethyldodecylammonium hydroxide, inner salt,
(4-sulfobutyl)dimethyldodecylammonium hydroxide, inner salt,
(3-sulfobutyl)dimethyldodecylammonium hydroxide, inner salt,
(3-sulfopropyl)diethyldodecylammonium hydroxide, inner salt,
(4-sulfobutyl)diethyldodecylammonium hydroxide, inner salt,
(3-sulfopropyl)dimethyloctadecylammonium hydroxide, inner salt,
and the like.

Sulfobetaines are generally prepared by reacting a tertiary amine with a sulfone or by quaternizing a tertiary aminoalkylene sulfonate. For example,

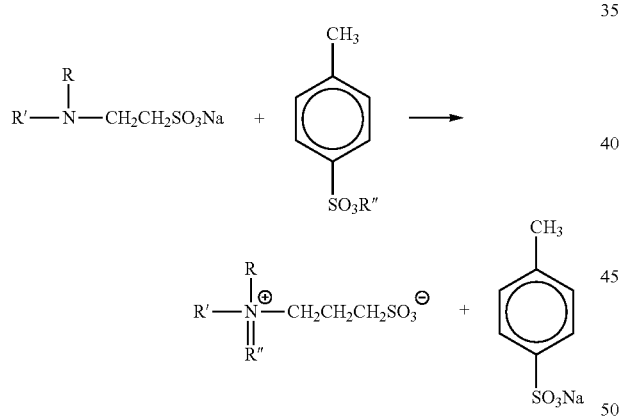

Commercially available zwitterions are often mixtures of several zwitterionic compounds. Typical commercial zwitterions include acyl (coco fatty) amido ammonium sulfonic acid betaine, alkyl (coco fatty) ammonium sulfonic acid betaine, cetyl ammonium sulfonic acid betaine, and alkyl amido betaines.

The betaine type compound useful in this disclosure has the structure:

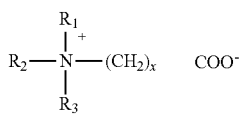

wherein $R_1$, $R_2$ and $R_3$ are the same as defined herein-above and wherein x is an integer having a value of 1 to 4. These compounds do not fall within the strict definition of betaines. However, by virtue of the fact that they contain a quaternary ammonium nitrogen atom which is substituted with a carboxyl containing radical and that they form an inner salt, these compounds are being referred to as betaine type compounds. These compounds, being inner salts of quaternary ammonium compounds, react with smectite type clays in the same manner as the quaternary ammonium compounds (A).

The betaine type compounds are made by reacting a tertiary amine with an alpha-halo-acid salt as described in U.S. Pat. No. 2,958,682 or by reacting a tertiary amine with acrylic or methacrylic acid by the procedure described in U.S. Pat. No. 4,012,437.

Betaine type compounds can include $R_1$ and $R_2$ as alkyl groups containing 12 to 22 carbon atoms, and $R_3$ can be methyl and x can be one. In one embodiment, a betaine type compound can be the one wherein $R_1$ and $R_2$ are derived from hydrogenated tallow, $R_3$ is methyl and x is one.

The following are examples of polyzwitterions (single polymers) having anionic and cationic spaced charge sites that can be used in the clay/polymer systems of the disclosure.
a. Polybetaines
  i. Polysulfobetaines
  ii. Polycarboxybetaines
  iii. Polyphosphobetaines
  iv. Polyamine Oxides
b. Polyphosphine oxide:
  i. sulfo-phosphine
  ii. carboxy-phosphine
  iii. Phospho-phosphine The following are examples of polyampholytes with a charge balance in a range of 5:1 to 1:5 anionic to cationic charge that can be used in the clay/polymer systems of the disclosure.
a. Anionic polymers
  i. Carboxylate/cation copolymers
  ii. Sulfonates/cation copolymers
  iii. Phosphonates/Cation copolymer The following are examples of anionic/cationic complexes with a charge balance ranging from 5:1 to 1:5 that can be used in the clay/polymer systems of the disclosure.
  i. Polycarboxylate/polycation complexes
  ii. Polysulfonate/polycation copolymers
  iii. Polyphosphonates/cation copolymer
  iv. Cross-linked polyanions, cross-linked polycations of the list above
  v. Cationic telechelic polymers mixed with anionic telechelic polymers In one embodiment, the cationic polymer can comprise a monomer having Formula I:

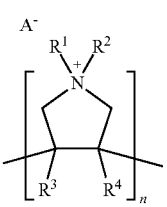

(I)

wherein
A is a counterion; and, $R^1$, $R^2$, $R^3$, and $R^4$ are each independently selected from the group consisting of hydrogen and $C_1$-$C_{10}$ alkyl.

n=5-10,000,000

For example, the cationic polymer comprising the monomer of Formula I can include poly(dimethyldiallylammonium chloride).

In accordance with another embodiment, the cationic polymer can comprise a monomer having a Formula II:

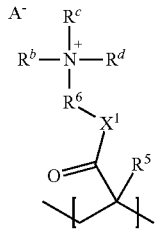

(II)

wherein:

A is a counterion;

$X^1$ is selected from the group consisting of O, S, $NR^a$;

$R^5$ is selected from the group consisting of hydrogen, halo, acetamido, cyano, $C_1$-$C_{50}$ alkyl, $C_2$-$C_{50}$ alkenyl, $C_2$-$C_{50}$ alkynyl, $C_3$-$C_8$ cycloalkyl, $C_4$-$C_8$ cycloalkenyl, aryl, heteroaryl, and heterocycloalkyl;

$R^6$ is selected from the group consisting of $C_1$-$C_{50}$ alkylene, $C_2$-$C_{50}$ alkenylene, $C_2$-$C_{50}$ alkynylene, $C_3$-$C_8$ cycloalkylene, $C_4$-$C_8$ cycloalkenylene, polyether, arylene, heteroarylene, and heterocycloalkylene; and $R^a$, $R^b$, $R^c$, and $R^d$ are each selected from the group consisting of hydrogen, $C_1$-$C_{50}$ alkyl, $C_2$-$C_{50}$ alkenyl, $C_2$-$C_{50}$ alkynyl, $C_3$-$C_8$ cycloalkyl, $C_4$-$C_8$ cycloalkenyl, aryl, heteroaryl, and heterocycloalkyl.

In some embodiments, suitable monomers of Formula II for use in the present disclosure include acrylamide monomers and alkylacrylamide monomers. In some of these embodiments, $X^1$ is NH, $R^5$ is hydrogen or methyl, $R^6$ is $C_1$-$C_{50}$ alkylene, and $R^b$, $R^c$, and $R^d$ are each independently $C_1$-$C_{50}$ alkyl.

Suitable monomers of Formula II for use in the present disclosure according to these embodiments include, for example, (3-acrylamidoethyl)trimethylammonium chloride and (3-acrylamidopropyl)trimethylammonium chloride.

In some embodiments, suitable cationic monomers of Formula II for use in the present disclosure include acrylate monomers and alkylacrylate monomers, such as, for example, methyl acrylates and ethyl acrylates, and propyl acrylates. In some of these embodiments, $X^1$ is O, $R^5$ is hydrogen, methyl, ethyl, or propyl, $R^6$ is $C_1$-$C_{50}$ alkylene, and $R^b$, $R^c$, and $R^d$ are each independently $C_1$-$C_{50}$ alkyl.

Suitable monomers of Formula II for use in the present disclosure according to these embodiments include, for example, [2-(acryloyloxy)ethyl]trimethylammonium chloride, [3-(methacryloylamino)propyl]trimethylamine, [3-(methacryloylamino)propyl]trimethylammonium chloride, [2-(methacryloyloxy)ethyl]trimethylammonium chloride, and [2-(methacryloyloxy)ethyl]trimethylammonium methyl sulfate.

In some embodiments, the cationic polymer can include styrene functionalized with an ammonium group, such as, for example, (vinylbenzyl)trimethylammonium chloride.

In some embodiments, the cationic polymer of the present disclosure can comprise a copolymer of dimethylamine and epichlorohydrin.

Compounds of the following general Formula III can be used as cationic monomers for manufacturing cationic acrylamide polymers:

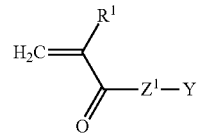

(III)

wherein $R^1$ stands for hydrogen or methyl, $Z^1$ stands for O, NH or $NR^4$, wherein $R^4$ stands for alkyl with 1 to 4 carbon atoms, and Y stands for one of the groups

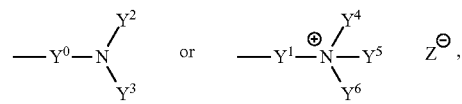

wherein $Y^0$ and $Y^1$ stand for alkylene with 2 to 6 carbon atoms, optionally substituted with hydroxy groups, $Y^2$, $Y^3$, $Y^4$, $Y^5$, and $Y^6$, independently of each other, stand for alkyl with 1 to 6 carbon atoms, and $Z^-$ stands for halogen, acetate or methyl sulfate.

Compounds of the following general Formula VI and Formula VII can be used as cationic monomers for manufacturing cationic acrylamide polymers:

Formula VI

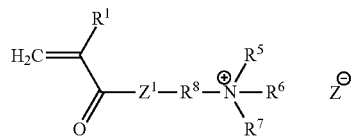

(VI)

$Z^1$ stands for O, NH or $NR^4$, wherein $R^4$ stands for hydrogen or methyl, $R^1$ stands for hydrogen or methyl, $R^5$ and $R^6$ stand, independently of each other, for alkyl with 1 to 6 carbon atoms, $R^7$ stands for alkyl, aryl and/or aralkyl with 8 to 32 carbon atoms, $R^8$ stands for alkylene with 1 to 6 carbon atoms, and Z– stands for halogen, pseudohalide ions, methyl sulfate or acetate;

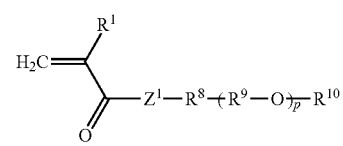

(VII)

wherein $Z^1$ stands for O, NH or $NR^4$, wherein $R^4$ stands for alkyl with 1 to 4 carbon atoms, $R^1$ stands for hydrogen or methyl,
$R^8$ stands for alkylene with 1 to 6 carbon atoms,
$R^9$ stands for alkylene with 2 to 6 carbon atoms, and
$R^{10}$ stands for hydrogen, alkyl, aryl, and/or aralkyl with 8 to 32 carbon atoms, and
p stands for an integer between 1 to 50.

Protonated or quaternized dialkylaminoalkyl(meth)acrylates or dialkylaminoalkyl(meth)acryl-amides with $C_1$ to $C_3$-alkyl or $C_1$ to $C_3$-alkylene groups are preferably used as cationic monomers for manufacturing the cationic acrylamide polymers according to the disclosure. The methyl chloride-quaternized, ethyl chloride-quaternized, propyl chloride-quaternized, or isopropyl-quaternized ammonium salts of N,N-dimethylaminomethyl(meth)acrylate, N,N-dimethylaminoethyl(meth)acrylate, N,N-dimethylaminopropyl (meth)acrylate, N,N-diethyl-aminomethyl(meth)acrylate, N,N-diethylaminoethyl(meth)acrylate, N,N-diethylaminopropyl-(meth)acrylate, N,N-dimethylaminomethyl(meth)acrylamide, N,N-dimethylaminoethyl-(meth)acrylamide and/or N,N-dimethylaminopropyl(meth)acrylamide are more preferably used. Instead of the alkyl chlorides (i.e., methyl chloride, ethyl chloride, propyl chloride, and isopropyl chloride), the corresponding bromides, iodides, sulfates, etc. may also be used for the quaternization of said N,N-dialkylaminoalkyl(meth)acrylate and N,N-dialkylaminoalkyl(meth)acrylamide derivatives.

In a preferred embodiment of the disclosure, the cationic acrylamide polymer comprises cationic copolymers containing acrylamide units and cationic monomer units selected from ADAME-Quat (quaternized N,N-dimethylaminoethyl acrylate) and DIMAPA-Quat (quaternized N,N-dimethylaminopropyl acrylamide).

In a preferred embodiment, the cationic acrylamide polymers contain at least 10 wt. %, at least 15 wt. % or at least 20 wt. %; more preferably at least 25 wt. %, at least 30 wt. %, at least 35 wt. %, at least 40 wt. % or at least 45 wt. %; still more preferably at least 50 wt. %, at least 55 wt. %, at least 60 wt. %, at least 65 wt. % or at least 70 wt. %; most preferably at least 75 wt. %, at least 80 wt. % or at least 85 wt. %; and in particular at least 88 wt. %, at least 90 wt. % or at least 92 wt. % of cationic monomer units based on the total weight of the cationic acrylamide polymer.

In another preferred embodiment, the cationic acrylamide polymers contain 10-99 wt. %, more preferably 20-98 wt. %, still more preferably 30-96 wt. %, most preferably 50-94 wt. %, and in particular 75-92 wt. % of cationic monomer units, preferably ADAME-Quat, based on the total weight of the cationic acrylamide polymer.

In another preferred embodiment, the cationic acrylamide polymers contain 1.0-50 wt. %, more preferably 2.0-40 wt. %, even more preferably 4.0-35%, still more preferably 6.0-30 wt. %, most preferably 8.0-25 wt. % and in particular 10-20 wt. % acrylamide based on the total weight of the cationic acrylamide polymer.

In some embodiments, the cationic polymer of the present disclosure can include one or more of the following:

| Chemical Name | Charge | % Charge | MW |
|---|---|---|---|
| Magnafloc 455 | cationic | Very Low | Very High |
| HyperDrill CP 944 | cationic | Low | Low |
| HyperFloc CE 809 | cationic | Low | Medium |
| HyperFloc CP 905 | cationic | Low | Medium |
| 611BC | cationic | Low | High |
| 625BC | cationic | Low | High |
| Hyperfloc 905 | cationic | Low | High |
| Hyperfloc 906 | cationic | Low | High |
| Hyperfloc 907 | cationic | Low | High |
| Percol 787 | cationic | Low | High |
| Zetag 7529 | cationic | Low | High |
| Zetag 7623 | cationic | Low | High |
| Zetag 8160 | cationic | Low | High |
| Zetag 7650 | cationic | Low | Very High |
| HyperFloc CE 834 | cationic | Low-Medium | Medium |
| HyperFloc CP 908 | cationic | Low-Medium | Medium |
| Percol 722 | cationic | Low-Medium | High |
| HyperFloc CP 9160 | cationic | Medium | Medium |
| Zetag 7529 | cationic | Medium | Medium |
| 523K | cationic | Medium | Medium-High |
| 852BC | cationic | Medium | Medium-High |
| Hyperfloc CP 908 | cationic | Medium | Medium-High |
| Percol 763 | cationic | Medium | Medium-High |
| Zetag 7563 | cationic | Medium | Medium-High |
| Percol 753 | cationic | Medium | High |
| Zetag 7692 | cationic | Medium | High |
| Zetag 7867 | cationic | Medium | High |
| Zetag 8120 | cationic | Medium | High |
| Zetag 8660 | cationic | Medium-High | High |
| 533K | cationic | High | High |
| Hyperfloc CP910 | cationic | High | High |
| Percol 755 | cationic | High | High |
| Zetag 7555 | cationic | High | High |
| Zetag 7557 | cationic | High | High |
| Zetag 7587 | cationic | High | High |
| Zetag 7635 | cationic | High | High |
| Magnafloc 368 | cationic | Very High | Low |
| Praestol K280FL | cationic | Very High | High |
| 555K | cationic | Very High | Very High |
| 655BC | cationic | Very High | Very High |
| 658K | cationic | Very High | Very High |
| 857BS | cationic | Very High | Very High |
| 859BS | cationic | Very High | Very High |
| Hyperfloc CP 911 | cationic | Very High | Very High |
| Hyperfloc CP 911 | cationic | Very High | Very High |
| Hyperfloc CP 912 | cationic | Very High | Very High |
| Hyperfloc CP 913 | cationic | Very High | Very High |
| Zetag 7587 | cationic | Very High | Very High |
| Zetag 7635 | cationic | Very High | Very High |

The anionic polymer of the present disclosure can comprise a monomer having a Formula IV:

(IV)

wherein:
$X^1$ is selected from the group consisting of O, S, $NR^a$;
$Y^1$ is selected from the group consisting of COO—,

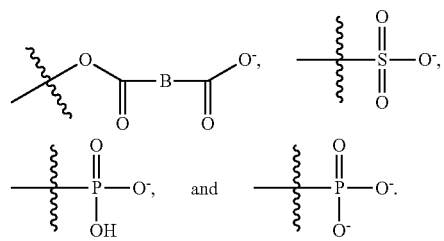

B is $C_1$-$C_{10}$ alkylene or $C_2$-$C_{10}$ alkenylene;

$R^5$ is selected from the group consisting of hydrogen, halo, acetamido, cyano, $C_1$-$C_{50}$ alkyl, $C_2$-$C_{50}$ alkenyl, $C_2$-$C_{50}$ alkynyl, $C_3$-$C_8$ cycloalkyl, $C_4$-$C_8$ cycloalkenyl, aryl, heteroaryl, and heterocycloalkyl;

$R^6$ is selected from the group consisting of $C_1$-$C_{50}$ alkylene, $C_2$-$C_{50}$ alkenylene, $C_2$-$C_{50}$ alkynylene, $C_3$-$C_8$ cycloalkylene, $C_4$-$C_8$ cycloalkenylene, polyether, arylene, heteroarylene, and heterocycloalkylene; and $R^a$ is selected from the group consisting of hydrogen, $C_1$-$C_{50}$ alkyl, $C_2$-$C_{50}$ alkenyl, $C_2$-$C_{50}$ alkynyl, $C_3$-$C_8$ cycloalkyl, $C_4$-$C_8$ cycloalkenyl, aryl, heteroaryl, and heterocycloalkyl.

In some embodiments, suitable anionic monomers of Formula IV for use in the present disclosure include acrylamide monomers and alkylacrylamide monomers. In some of these embodiments, $X^2$ is NH, $R^5$ is hydrogen or methyl, and $R^6$ is $C_1$-$C_{50}$ alkylene.

Suitable monomers of Formula IV for use in the present disclosure according to these embodiments include, for example, salts of 2-acrylamido-2-methyl-1-propanesulfonic acid and salts of 2-acrylamido-2-methyl-1-propanephosphonic acid.

In some embodiments, suitable anionic monomers of Formula IV for use in the present disclosure include acrylate monomers and alkylacrylate monomers, such as, for example, methyl acrylates and ethyl acrylates, and propyl acrylates. In some of these embodiments, $X^2$ is O, $R^5$ is hydrogen, methyl, ethyl, or propyl, $R^6$ is $C_1$-$C_{50}$, and $Y^1$ is COO— or

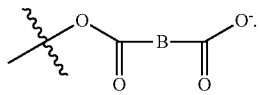

Suitable monomers of Formula IV for use in the present disclosure according to these embodiments include, for example, 2-carboxyethyl acrylate, mono-2-(methacryloyloxy)ethyl maleate, and mono-2-(methacryloyloxy)ethyl succinate.

Additionally or alternatively, the anionic polymer of the present disclosure also can comprise a monomer having a Formula V:

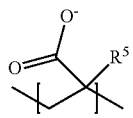

wherein:

$R^5$ is selected from the group consisting of hydrogen, halo, acetamido, cyano, $C_1$-$C_{50}$ alkyl, $C_2$-$C_{50}$ alkenyl, $C_2$-$C_{50}$ alkynyl, $C_3$-$C_8$ cycloalkyl, $C_4$-$C_8$ cycloalkenyl, aryl, heteroaryl, and heterocycloalkyl.

In some embodiments, suitable anionic monomers of Formula V for use in the present disclosure include salts of acrylic acid (e.g., sodium acrylate), salts of methacrylic acid, (e.g., sodium methacrylate), salts of 2-ethylacrylic acid, salts of 2-propylacrylic acid, salts of 2-bromoacrylic acid, salts of 2-(bromomethyl)acrylic acid, and salts of 2-(trifluoromethyl) acrylic acid.

Additionally or alternatively, the anionic polymer of the present disclosure can comprise an allyl sulfonic acid, such as, for example, salts of 3-allyloxy-2-hydroxy-1-propanesulfonic acid.

For the purpose of the specification the term "anionic acrylamide polymer" refers to a negatively charged material composed of macromolecules containing >10 monomer units, wherein the anionic acrylamide polymer contains acrylamide, optionally at least one further structurally different non-ionic monomer, optionally at least one non-ionic amphiphilic monomer, and at least one anionic monomer.

The anionic acrylamide polymers may be copolymers, i.e. bipolymers, terpolymers, quaterpolymers, etc., which comprise acrylamide and, e.g., at least one further structurally different non-ionic monomer, and at least one anionic monomer.

The following anionic monomers can be used for manufacturing anionic acrylamide polymers:

a. olefinically unsaturated carboxylic acids and carboxylic acid anhydrides, in particular acrylic acid, methacrylic acid, itaconic acid, crotonic acid, glutaconic acid, maleic acid, maleic anhydride, fumaric acid and the water-soluble alkali metal salts thereof, alkaline earth metal salts thereof, and ammonium salts thereof;

b. olefinically unsaturated sulfonic acids, in particular aliphatic and/or aromatic vinylsulfonic acids, for example vinylsulfonic acid, allylsulfonic acid, styrenesulfonic acid, acrylic and methacrylic sulfonic acids, in particular sulfoethyl acrylate, sulfoethyl methacrylate, sulfopropyl acrylate, sulfopropyl methacrylate, 2-hydroxy-3-methacryloxypropylsulfonic acid and 2-acrylamido-2-methylpropanesulfonic acid, and the water-soluble alkali metal salts thereof, alkaline earth metal salts thereof, and ammonium salts thereof;

c. olefinically unsaturated phosphonic acids, in particular, for example, vinyl- and allyl-phosphonic acid and the water-soluble alkali metal salts thereof, alkaline earth metal salts thereof, and ammonium salts thereof; and/or d. sulfomethylated and/or phosphonomethylated acrylamides and the water-soluble alkali metal salts thereof, alkaline earth metal salts thereof, and ammonium salts thereof.

The anionic comonomers are preferably selected from the group consisting of acrylic acid, methacrylic acid, itaconic acid, crotonic acid, glutaconic acid, maleic acid, maleic anhydride, and fumaric acid for copolymerization with acrylamide. More preferably, the anionic monomers are selected from the group consisting of acrylic acid, methacrylic acid, itaconic acid, and crotonic acid. The water-soluble alkali metal salts of acrylic acid and in particular sodium potassium acrylate are most preferred according to the disclosure.

In a preferred embodiment, the anionic acrylamide polymers contain at least 5.0 wt. %, more preferably at least 25 wt. %, still more preferably at least 50 wt. %, most preferably at least 75 wt. %, and in particular 99 wt. % of anionic monomer units based on the total weight of the anionic acrylamide polymer.

In another preferred embodiment, the anionic acrylamide polymers contain 1.0-99 wt. %, more preferably 6.0-80 wt. %, still more preferably 8.0-60 wt. %, most preferably 10-50 wt. %, and in particular 12-35 wt. % of anionic monomer units.

In another preferred embodiment, the anionic acrylamide polymers contain 1.0-99 wt. %, more preferably 10-97 wt. %, even more preferably 20-95 wt. %, still more preferably 40-93%, most preferably 60-91 wt. % and in particular 70-89 wt. % acrylamide based on the total weight of the anionic acrylamide polymer.

In a particularly preferred embodiment, the anionic acrylamide polymers contain acrylamide and acrylic acid as the only monomer components, wherein the relative weight ratio of acrylamide to acrylic acid is preferably within the range of from 1.5:1 to 15:1, more preferably of from 1.75:1 to 12.5:1, even more preferably of from 2:1 to 10:1 and in particular 2.2:1 to 8:1.

In another particularly preferred embodiment, the anionic acrylamide polymers contain acrylamide and acrylic acid as the only monomer components, wherein the relative weight ratio of acrylamide to acrylic acid is preferably (4.5±4):1 and in particular (4.5±3):1.

In some embodiments, the anionic polymer can include styrene functionalized with sulfonic acid, phosphonic acid, or carboxylic acid. Suitable monomers for use in the present disclosure according to these embodiments include salts of, for example, 2-vinylbenzoic acid, 3-vinylbenzoic acid, 4-vinylbenzoic acid, 2-vinylbenzenesulfonic acid, 3-vinylbenzenesulfonic acid, 4-vinylbenzenesulfonic acid, 2-vinylbenzenephosphonic acid, 3-vinylbenzenephosphonic acid, and 4-vinylbenzenephosphonic acid. Compositions in accordance with embodiments of the disclosure can include one or more of the following anionic polymers:

| Chemical Name | Charge | % Charge | MW |
|---|---|---|---|
| AF 104 | anionic | Very Low | Standard |
| Magnafloc 10 | anionic | Very Low | High |
| HyperFloc AE 843 | anionic | Very Low | Very High |
| HyperFloc AF 304 | anionic | Very Low | Very High |
| Magnafloc 338 | anionic | Very Low | Very High |
| Praestol 2510 | anionic | Low | Medium-High |
| AF 105 | anionic | Low-Medium | Standard |
| AF 106 | anionic | Low-Medium | Standard |
| AF 107 | anionic | Low-Medium | Standard |
| Alcomer 60RD | anionic | Low-Medium | Standard |
| Praestol 2530 | anionic | Low-Medium | Medium-High |
| Magnafloc 156 | anionic | Low-Medium | High |
| Magnafloc 336 | anionic | Low-Medium | Very High |
| Praestol 2540 | anionic | Medium | Medium-High |
| Alcomer 120L | anionic | Medium | High |
| Alcomer 123L | anionic | Medium | High |
| Praestol 2640 | anionic | Medium | High |
| Magnafloc 525 | anionic | Medium-High | Medium |
| Magnafloc 155 | anionic | Medium-High | High |
| Alclar 662 | anionic | Medium-High | Very High |
| HyperDrill AF 251 | anionic | High | Low |
| HyperDrill DF 2010 | anionic | High | Very Low |
| HyperDrill DF 2010-D | anionic | High | Very Low |
| HyperDrill DF 2020 | anionic | High | Very Low |
| HyperDrill DF 2020-D | anionic | High | Very Low |
| Alcomer 507 | anionic | High | Medium |
| HyperDrill AF 250 | anionic | High | Medium |
| Magnafloc 611 | anionic | High | High |
| Magnafloc 919 | anionic | High | High |
| Alcomer 110RD | anionic | High | Very High |
| Dispex N100 | anionic | Very High | Very Low |
| Alcomer 72 | anionic | Very High | Low |
| Alcomer 72L | anionic | Very High | Low |
| Alcomer 1771 | anionic | Very High | Medium |

Barrier Articles Containing the Clay/Polymer Systems

A barrier article, such as a geosynthetic liner, can be loaded with a content of the clay/polymer composition in an amount of about 0.1 lbs/ft$^2$ to about 5 lbs/ft$^2$, about 0.5 lbs/ft$^2$ to about 4 lbs/ft$^2$, about 0.5 lbs/ft$^2$ to about 1.6 lbs/ft$^2$, about 1 lbs/ft$^2$ to about 3 lbs/ft$^2$, about 0.88 lbs/ft$^2$ to about 1.5 lbs/ft$^2$, about 0.9 lbs/ft$^2$ to about 1.5 lbs/ft$^2$, and about 0.7 lbs/ft$^2$ to about 2 lbs/ft2. Other suitable loadings include, about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 lbs/ft$^2$. In some embodiments, the composition is disposed adjacent to fabric fibers throughout at least 20% of a depth of at least one of the fabrics.

In various embodiments, the clay/polymer systems can include a combination of anionic and cationic polymers. Exemplarily, but non-limiting, examples of combinations of cationic and anionic polymers include the combination of Polyquaternium 35 (CAS #189767-69-9) and a copolymer of sodium acrylate and poly 2-propenoic acid, sulfomethyl ester, sodium salt, the combination of a copolymer of acryloxyethyltrimethylammoniumschloride-acrylamide and 2-Propenamide and copolymers of 2 Propenoic acid homopolymer sodium salt and 2-Propenamide, the combination of Polyethylenimine and Maleic anhydride copolymers, the combination of Dimethylamine epichlorohydrin copolymer and Polystyrene sulfonate, the combination of Polymethacrylamidopropyltrimonium chloride and Polystyrene sulfonate, the combination of Polyquaternium 68 and Vinylpyrrolidone, the combination of Quaternized copolymer of vinyl pyrrolidone, methacrylamide, vinyl imidazole and quaternized vinyl imidazole (Polyquaternium 68) and Copolymer of sodium acrylate and acrylamide, the combination of Quarternized copolymer of vinyl pyrrolidone, methacrylamide, vinyl imidazole and quaternized vinyl imidazole (Polyquaternium 68) and Copolymer of sodium acrylate and acrylamide, the combination of 1-Dodecanaminium, N,N-dimethyl-N-[3-[(2-methyl-1-oxo-2-propenyl)amino]propyl], chloride, polymer with N-[3-(dimethylamino)propyl]-2-methyl-2-propenamide and 1-ethenyl-2-pyrrolidinone (Polyquaternium 51) and Copolymer of malonic acid, sodium salt and benzoic acid, 4-ethenyl-, sodium salt, the combination of 1H-Imidazolium, 1-ethenyl-3-methyl sulphate, polymer with 1-ethenylhexahydro-2H-azepin-2-one and 1-ethenyl-2-pyrrolidinone (Polyquaternium 46) and Copolymer of sodium acrylate and methacrylamide, the combination of Quaternary ammonium salt of the copolymer of vinyl pyrrolidone and quaternized imidazoline (Polyquaternium 44) and Copolymer of maleic anhydride and vinylalcohol, the combination of 2-Propen-1-aminium, N,N-dimethyl-N-2-propenyl-, chloride, polymer with 2-propenamide and 2-propenoic acid (Polyquaternium 39) and Copolymer of 2-propenoic acid, 1-methyl-1-sulfoethyl ester, sodium salt and vinylpyrlerolidone, and the combination of Homopolymer of methacryloyltrimethylchloride (Polyquaternium 37) and Copolymer of 2-propenoic acid, 2-methyl-, 1-methyl-1-sulfoethyl ester, sodium salt and acrylamide. In the foregoing list, cationic polymers are listed first in the combination and anionic polymer are listed second.

Articles, such a geosynthetic liners, that include the clay/polymer compositions of the disclosure can be applied to a protect against leakage into the ground water of aggressive leachates. For example, a waste containment cell can be lined with the articles, which can then be filled with the waste product, which in turn generates the leachate to be contained. Alternatively, the compositions can be useful for direct application, for example, direct application to a soil and/or sand, without the need for geotextile layers. Directly applied composition can be covered by a layer, such as a layer of soil or a membrane material.

Turning now to the drawings, and initially to FIG. 1, there is illustrated a multi-layer article of manufacture, generally designated by reference numeral 10 useful as an ionic liquid barrier material including a pair of woven or non-woven flexible sheet material layers, generally designated 12 and 14, having a layer of clay/polymer mixture 16 sandwiched therebetween. The pair of sheet material layers 12 and 14 are structurally interconnected one to the other with fibers, filaments or strands of flexible material 18 from one fabric layer 12 or 14 interconnected to the other sheet material layer 12 or 14 at spaced locations over essentially the entire internal major surfaces 22 and 24 of the sheet material layers 12 and 14. Alternatively, the fabrics are secured together by sewing or quilting wherein at least a portion of the clay/polymer material, at least on one of the surfaces of the layer that is penetrated with the sewing or needle-punching needle has been wetted with water or other lubricant, preferably aqueous, to lubricate the needle penetration and thereby lessen article vibration during manufacture.

It has been advantageously found that the use of cationic and anionic polymers, as in the composition of the disclosure, beneficially results in ionic crosslinking of the polymer. This in turn can reduce the amount of polymer that is released from the article. Regardless, use of additional membranes to further aid in reduction of polymer release or improve the interfacial surface properties of the article are also contemplated herein. For example, the multi-layer article of manufacture can optionally include one or more additional layers, for example, to enhance the interfacial properties of the article. For examples, the article can include a membrane, for example, a plastic membrane disposed adjacent to one of the flexible sheet material layers. For example, the plastic membrane can be disposed adjacent to the flexible sheet material layer configured to be disposed against the surface of a leachate containment system or waste containment cell. Such a membrane can aid in preventing release of the polymer from the article. Release of the polymer can disadvantageously reduce the interfacial surface energy of the article, which in turn can result in a landslide and failure of the article resulting therefrom.

In various embodiments, the flexible sheet material layers 12 and 14 can be needle-punched, sewn or otherwise secured together surrounding a layer of clay and polymer, powdered or granular material, much more effectively, efficiently and maintaining a uniform thickness of material while experiencing substantially less needle wear and breakage by wetting the abrasive material prior to needle penetration. In accordance with a preferred embodiment, the fabrics are secured together structurally with threads, fibers, filaments or strands of flexible material from one non-woven fabric layer interconnected to the fibers of the other fabric layer at spaced intervals (e.g., 2 to 500 mil spacing) by applying water or other lubricating liquid to the surface of the layer of clay/polymer material, or to the surfaces of the clay/polymer particles during formation of the clay/polymer material layer, and thereby avoiding substantial needle wear and breakage while manufacturing a tighter, denser product with the opposed fabrics 12 and 14 held tighter together and surrounding a more uniform thickness of clay/polymer material as result of less vibration experienced by the product during manufacture. Alternatively, the finished article can be contacted with water, for example by spraying or dipping to hydrate the clay/polymer composition. Hydration of the clay/polymer composition is completed to moisture content of less than 30% based on the total weight of the composition. High moisture contents can result in product that is uneconomical to ship due to increased weight and/or problematic because of pre-gelling of the clay/polymer composition, as discussed above. In yet another alternative, the composition is not hydrated with water during any point of the process of manufacturing.

Figure 4:
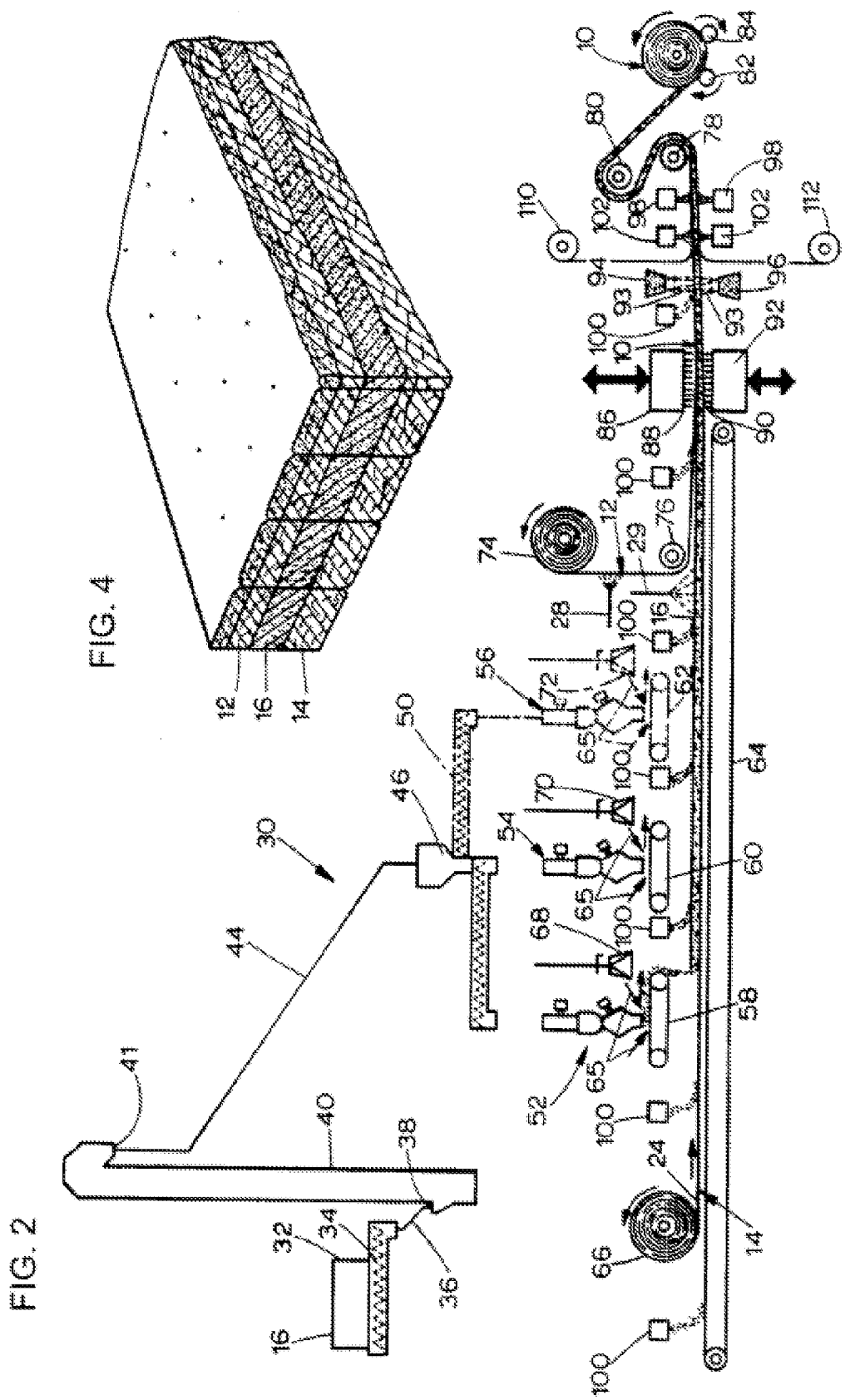
FIG. 4 is a partially broken-away perspective view of an ionic liquid barrier formed from multiple layers of the same, or different clay/polymers or reactive material-containing layers.

In accordance with another feature of the present disclosure, the multi-layer article of manufacture, manufactured in accordance with the present disclosure, can be made with essentially no adhesive contacting the major internal surfaces 22 and 24 of flexible sheet material layers 12 and 14 so that the clay/polymer layer 16 sandwiched between the flexible sheet material layers 12 and 14 will maintain complete efficacy while being an article of manufacture that is sufficiently structurally sound that it can be rolled up after manufacture, as shown in FIG. 4, without substantial loss of the intermediate clay/polymer layer 16.

It has also been unexpectedly and beneficially found that when the flexible sheet material layers 12 and 14 are structurally interconnected with the threads, fibers, filaments or strands of flexible material 18 from one non-woven fabric layer interconnected to the fibrous material of the other fabric layer, and wet or dry lubricating the abrasive material, such as by pre-wetting the abrasive layer or individual particles prior to needle-punching, as by spraying the abrasive layer surface via spray nozzles 28 or 29 disposed across the width of the abrasive material layer, or disposed to spray an under surface of non-woven fabric 22, as shown in FIG. 2. In this manner, the flexible sheet material layers 12 and 14, and the sandwiched or intermediate clay/polymer or other powdered or granular abrasive material layer 16 can be provided in a new and unexpectedly consistent thickness throughout the entire articles, while achieving structural integrity of an articles that has a reduced thickness with the same amount of abrasive material.

Turning now to FIG. 2, there is shown a schematic diagram of the method of manufacturing the multi-layered article of manufacture of the present disclosure, generally designated by reference numeral 10. A clay, such as bentonite 16, is mixed with cationic and anionic polymers and then charged to a clay receiving hopper 32. An auger 34, disposed at a lower end of the receiving hopper 32 and in fluid communication therewith, forces the clay/polymer dry mixture through conduit 36 to an inlet 38 of a clay/polymer elevator 40. The clay/polymer mixture is discharged from the elevator 40 at clay/polymer elevator outlet opening 41 through conduit 44 into a clay/polymer-receiving hopper 46. A pair of augers 48 and 50 in fluid communication with the lower end of hopper 46 force the clay/polymer mixture into one, two or three clay/polymer feeding mechanisms, generally designated by reference numerals 52, 54 and 56, for feeding the clay/polymer mixture in a controlled manner to one, two or three continuous feed conveyor belts 58, 60 and 62 successively aligned above an elongated product conveyor belt 64. The clay/polymer mixture generally is applied over a lower fabric layer 66 in an amount of about to about 10 pounds per square foot of fabric surface area, preferably about 0.75 to about 5 pounds per square foot.

A supply of a flexible sheet material in roll form 66 is disposed above the continuous product conveyor belt 64 to provide a continuous supply of flexible sheet material onto an upper surface of the product conveyor belt 64 for receiving a layer of clay/polymer mixture from one, two or all three of the clay feed conveyor belts 58, 60 and 62. Any one, two or all three of the clay/polymer feed conveyor belts 58, 60 and 62 can be used to provide one or more layers of clay/polymer mixture onto an upper surface 24 of the flexible sheet material held on top of the product conveyor belt 64, depending upon the thickness of clay/polymer mixture desired in the product. Dust collection suction devices 68, 70 and 72 are disposed near each continuous feed conveyor belt 58, 60 and 62 to clear the air of fine clay/polymer particles emanating from feeding mechanisms 52, 54 and 56. A second roll of flexible sheet material 74 is disposed on a downstream side of the feeding mechanisms 52, 54 and 56 and above the product conveyor belt 64. The second roll of flexible sheet material 74 is fed by power driven roller 76, power rollers 78 and 80 and wind up rollers 82 and 84 to dispose flexible sheet material layer 12 on top of the clay/polymer layer 16 to sandwich the clay/polymer layer 16 between lower flexible sheet material layer 14 and upper flexible sheet material layer 12.

In accordance with an embodiment, a needle punching device 86, as well known in the art as shown in U. K. published patent application G. B. 2,202,85A, and German patent DE 3,004,503, can be disposed above and below the multi-layer article 10, at a point in the manufacturing process where the upper and lower flexible sheet material layers 12 and 14 have sandwiched the clay/polymer layer 16 therebetween, to interconnect the upper and lower sheet material layers 12 and 14 with flexible threads, fibers, filaments or strands of flexible material from one fabric layer to the other fabric layer, as shown by needles 88 on the upper portion of the needle-punching device 86, and needles 90 on the lower portion of the needle-punching device 92. Needles 88 dislodge fibers from the upper flexible sheet material layer 12 and force the dislodged fibers from sheet material layer 12 into lower sheet material layer 14 to interconnect these dislodged fibers from the upper sheet material layer 12 to the lower sheet material layer 14. Optionally, needles 90 on the lower portion of the needle punching device 86 dislodge fibers form the lower sheet material layer 14 and force the dislodged fibers upwardly through the clay layer 16 to interconnect the dislodged fibers from lower sheet material layer 14 to the upper sheet material layer 12, thereby interconnecting the upper and lower sheet material layers 12 and 14. If needles 90 are used, the lower fabric layer 14 should also be a woven or a non-woven fabric layer.

Figure 3:
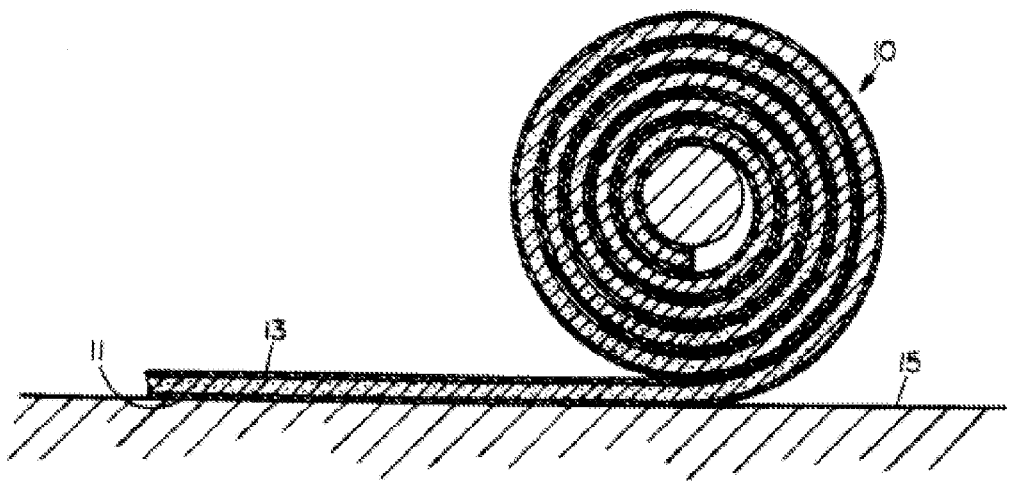
FIG. 3 is a side view of an ionic liquid barrier, including an upper layer of another barrier material, being installed on a soil surface.

As shown in FIG. 3, the multi-layer article of manufacture can be secured on its outer surfaces to a lower layer 11 and/or an upper layer 13 of another barrier material, such as a polyolefin e.g. polyethylene or polypropylene sheet material, or the polybutene or polypropene compositions disclosed in this assignee's U.S. Pat. Nos. 4,534,925; 4,534,926 and 4,668,724, hereby incorporated by reference. The composite article of FIG. 3 is particularly suitable for securing to planar surfaces such as a soil surface.

The clay/polymer mixture can be utilized as the sandwiched layer 16 between flexible sheet material layers 12 and 14 of the multi-layered articles of the present disclosure, as shown in FIG. 4. A preferred clay for mixing with polymers is sodium bentonite which is basically a hydratable montmorillonite clay of the type generally found in the Black Hills region of South Dakota and Wyoming. This clay has sodium as a predominant exchange ion.

In accordance with an embodiment, the articles may be manufactured to include, in addition to the clay/polymer mixture, a material capable of removing or interacting with one or more water-soluble contaminants from the water penetrating the outer fabric layer. These materials, for example, may be included in layers 12 and/or 14 of FIG. 4.

In accordance with another embodiment of the present disclosure, the contaminant interacting layer, comprising any contaminant adsorbent, absorbent, reactant, or contaminant neutralizing material can be supplied as a separate layer below or above the clay/polymer layer, e.g., see FIG. 4.

In accordance with another feature of the present disclosure, the contaminant removal material supplied as a separate layer, can be any material capable of adsorbing, absorbing, reacting with for insolubilization or for neutralization, while keeping the contaminant water-soluble in order to substantially lessen or remove the contaminant characteristics of the contaminants originally present in the water contacting the article of manufacture. Examples of materials capable of removing or neutralizing contaminants that are present in water include absorbent fibers, such as microcrystalline cellulose; attapulgite clay; zinc rincinoleate absorbed on an absorbent fiber or other absorbent material; amorphous silica powder; synthetic calcium silicate; polyolesin pulp; sodium alumino-silicate (type A sodium zeolite); multodextran; sodium silica aluminates (note that all the above are absorbents). Other materials, such as adsorbents include silica hydrogel based compositions; attapulgites; synthetic sodium magnesium silicates; synthetic calcium silicates; silicon dioxide; acid activated clays; type A sodium zeolites; and the like provided as a separate layer or mixed with a reduced thickness (a denser product) since the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are natural or synthetic zeolites and/or an organophilic clay which is basically a montmorillonite clay that has been reacted with a quaternary organic material to make it hydrophilic and absorbent to organic contaminants.

The flexible sheet materials 12 and 14 are, for example, geotextile fabrics, at least one of which is a non-woven fabric when the fabrics are needle-punched together. Any suitable fabrics can be used for this purpose, particularly since the fabrics have no liquid-impermeability purpose other than to achieve proper installation of clay/polymer layer 16. Suitable fabrics include woven and non-woven permeable and non-permeable fabrics made from polypropylene, poly-esters, nylon, propylene-ethylene copolymers, polypropylene-polyamide copolymers, and the like. The geotextile fabrics are preferred for their bacteriological and chemical resistance but the fabrics can be biodegradable since, once positioned, the fabrics have little importance except as a means to install a clay layer in the proper position. In some installations, the thickness of the fabric is not important and such fabrics generally are available in thicknesses of about 3 to about 30 mils, or about one to about 50 ounces of material per square yard.

Additional aspects and details of the disclosure will be apparent from the following examples, which are intended to be illustrative rather than limiting.

EXAMPLES

Needle Punched Samples

In the following examples in which the samples were needle punched, the needle punching was achieved as follows. The samples were prepared by applying the clay/additive mixture between two polypropylene geotextiles and needle-punching them using a loom. The needle punching density was approximately 10,000 to 12,000 strikes/ft$^2$. The clay/additive mixtures were prepared by weighing their respective components in a small bucket and mixing them together by hand. The clay/additive mixtures were applied to the base fabric equivalent at the desired mass per unit area. Once the clay/additive blends were evenly distributed over the base fabric, they were hydrated with fresh water (using a fine spray) at a ratio of 28 parts water per 100 parts of blend. The hydrated blends were covered with a 6 oz nonwoven polypropylene cap fabric and sent through the loom.

Non-Needle Punched Samples

In the following examples in which the samples were non-needle punched, the samples were prepared by applying a clay/additive mixture to a piece of filter paper disposed in the base of a filtrate loss cell at a desired mass per unit area and then covering the composition with an additional piece of filter paper.

Rigid Wall Permeameter Test Method

The hydraulic conductivity of the clay/polymer blends in accordance with the disclosure were tested in various examples using a rigid wall permeameter method (RWPM). The method included applying the clay/polymer mixture or needle punched sample to the base of a filtrate loss cell at a desired loading. The samples was then hydrated for 24 hours under a load of 21 kPa using a given permeant. Once hydrated, the load was removed and the cell was filled with the permeant. The pressure was then increased in the cell to achieve different hydraulic gradients. For example, a pressure of 0.5 bar was applied to test a sample at an equivalent of about 5 m of hydrostatic head pressure. The volume of water loss from the cell was recorded as a function of time. The leakage rate was then determined. The leakage rate and known area of the filtrate loss cell were used to derive the flux. The flux was converted to a hydraulic conductivity (k) expressed in cm/sec using D'Arcy's law. A clay/polymer layer with a thickness of 1 cm was used to calculate the hydraulic conductivity.

Examples 1-19

The hydraulic conductivity of the clay/polymer blends were initially assessed using a rigid wall permeameter method (RWPM). Examples 1-15 were prepared as needle-punched samples, and Examples 16-20 were prepared as non-needle punched samples. Example Comp. 1 is a comparative example illustrating the performance of a clay-only system. Type 16 bentonite was used as the clay component in each of the examples. Type 16 is a natural Wyoming sodium bentonite. The Type 16 bentonite was mixed with the respective "Polymer Combination". The combinations of anionic/cationic polymers are described as "A/C" in the tables. In regards to the anionic/cationic polymer blending ratio, for instance, an example with 3 parts of anionic polymer to 1 part of cationic polymer would be described as A/C (3:1). In all of the RWPM samples, the ratio of anionic to cationic polymer was 3:1. Examples 2-7 and 10-20 has an anionic to cationic charge ratio of 8.7/3.6 (excess anionic charge). In Examples 8 and 9 (marked with an * and **, respectively) the charge balance was varied by using different grades of polymers which had different inherent charge densities. Example 8 had an anionic to cationic charge ratio of 3.9/1.0 (excess anionic charge) and Example 9 had an anionic to cationic charge ratio of 3.0/4.1 (excess cationic charge).

In examples 16-20, which were non-needled punched samples, the dry clay/polymer mixture was applied to the base of a filtrate loss cell equivalent to 0.99 lbs/ft$^2$ (4.88 kg/m$^2$). Examples 1-15 were needle-punched GCLs prepared at dry clay/polymer mixture of 0.99 lbs/ft$^2$ (4.88 kg/m$^2$). Since clay has a natural moisture content of about 10%, the dry clay+polymer loading is about 0.88 lbs/ft$^2$ in both the needle punched and non-needle punched samples. Table 1 provides the hydraulic conductivity results for the RWPM testing in a NaCl permeant, a sea water permeant, and a permeant containing NaSO$_4$, KCl, CaSO$_4$, and MgSO$_4$. As illustrated in Table 1, the clay/polymer samples provide an effective barrier to the tested leachates, demonstrating significantly improved hydraulic conductivities as compared to a conventional clay-only system.

Figure 5:
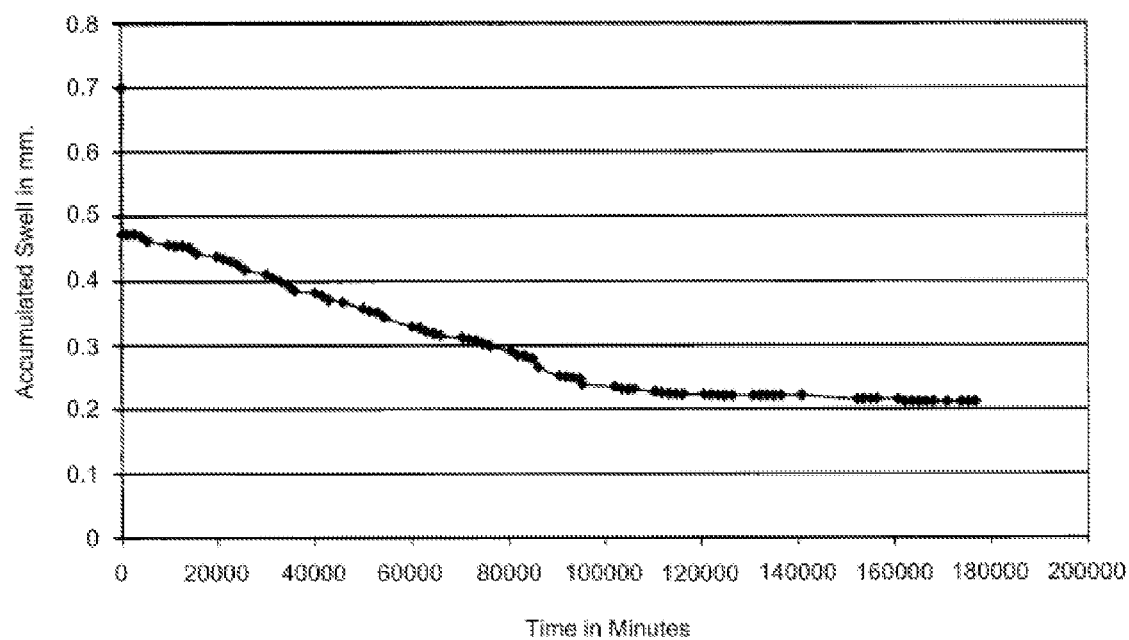
FIG. 5 is a graph showing clay/polymer swell in salt water, under a 20 kPa load, as a function of time.
Figure 6:
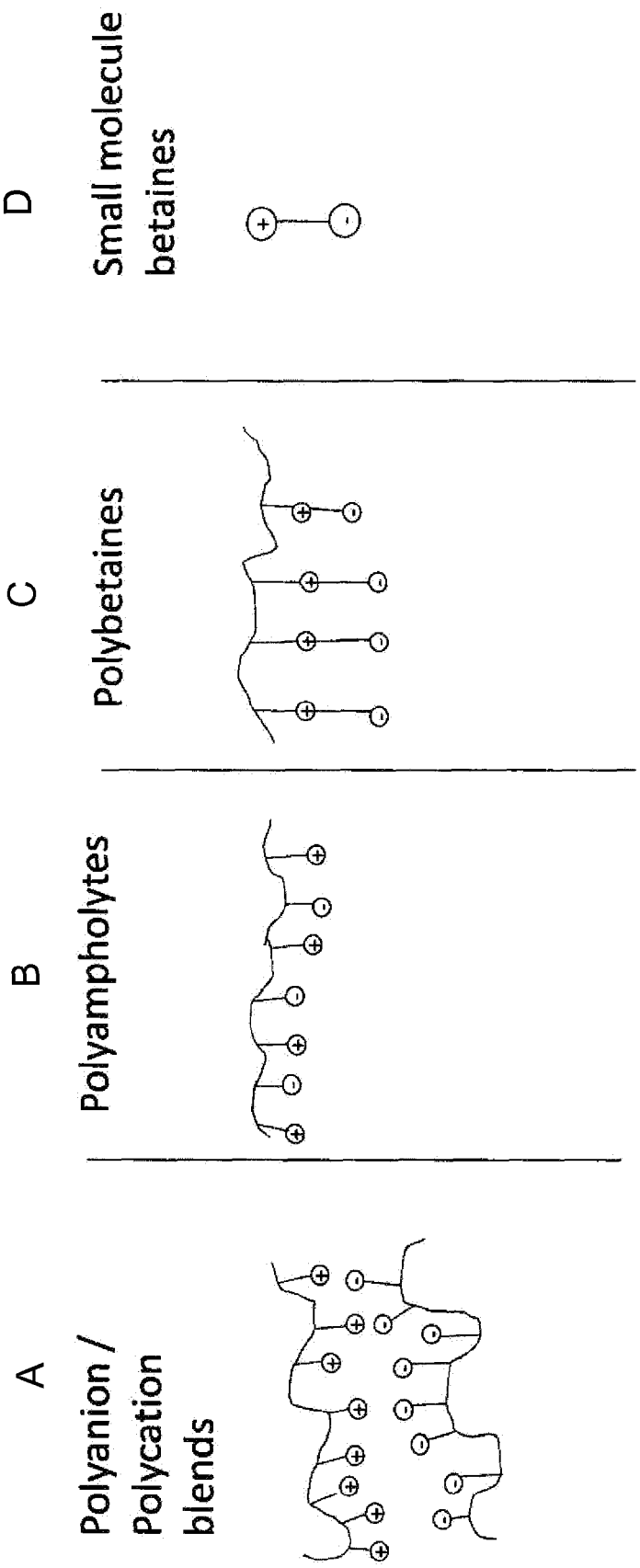
FIG. 6 is a schematic drawing of charge balanced clay additives comprising A—polyanion/polycation blends; B—polyampholytes; C—polybetaines; D—betaine monomers in accordance with embodiments of the disclosure.

FIG. 5 shows the reduced swelling of a GCL type specimen under load using an Oedometer for A/C 3:1 GCL when exposed to salt water under a load of 20 KPa. This demonstrates that in the presence of salt water, the systems in accordance with the disclosure did not swell (i.e., did not exhibit a swelling pressure). Conventionally, for a smectite based GCL it would be expected that swelling was necessary to provide an effective hydraulic barrier. Surprisingly, however, despite the lack of swelling pressures, the clay polymer systems in accordance with the disclosure provided an effective barrier, as measured by hydraulic conductivity, to the tested leachates.

TABLE 1

Rigid wall Hydraulic conductivity data of the various Anionic Polymer (A)/Cationic Polymer (C) Combinations vs. various aggressive leachates.

| Example # | Polymer Combination | Dry Clay/Polymer Loading (lbs/ft$^2$) | Polymer Loading (wt. %) | Permeant | Hydraulic Head (m) | Electrical Conductivity of the Permeant (μs/cm) | Hydraulic Conductivity (cm/sec) |
|---|---|---|---|---|---|---|---|
| Comp. 1 | 100% Clay | 0.88 | 0% | NaCl | 5 | 50,000 | $3.5 \times 10^{-7}$ |
| 2 | A/C (3:1) | 0.88 | 0.5% | NaCl | 5 | 50,000 | $2.3 \times 10^{-9}$ |
| 3 | A/C (3:1) | 0.88 | 0.5% | NaCl | 10 | 50,000 | $4.2 \times 10^{-8}$ |
| 4 | A/C (3:1) | 0.88 | 1.0% | NaCl | 5 | 50,000 | $7 \times 10^{-10}$ |
| 5 | A/C (3:1) | 0.88 | 1.0% | NaCl | 10 | 50,000 | $1.4 \times 10^{-9}$ |
| 6 | A/C (3:1) | 0.88 | 1.0% | NaCl | 15 | 50,000 | $2.3 \times 10^{-9}$ |
| 7 | A/C (3:1) | 0.88 | 1.5% | NaCl | 5 | 50,000 | $2 \times 10^{-10}$ |
| 8 | A/C (3:1) * | 0.88 | 1.5% | NaCl | 10 | 50,000 | $1.2 \times 10^{-9}$ |
| 9 | A/C (3:1) ** | 0.88 | 1.5% | NaCl | 15 | 50,000 | $1.7 \times 10^{-9}$ |
| 10 | A/C (3:1) | 0.88 | 3.0% | NaCl | 5 | 50,000 | $7 \times 10^{-11}$ |
| 11 | A/C (3:1) | 0.88 | 3.0% | NaCl | 10 | 50,000 | $4 \times 10^{-10}$ |
| 12 | A/C (3:1) | 0.88 | 3.0% | NaCl | 15 | 50,000 | $8 \times 10^{-10}$ |
| 13 | A/C (3:1) | 0.88 | 1% | Sea water | 5 | 50,000 | $9.68 \times 10^{-10}$ |
| 14 | A/C (3:1) | 0.88 | 1.5% | Sea water | 5 | 50,000 | $4.8 \times 10^{-10}$ |
| 15 | A/C (3:1) | 0.88 | 3% | Sea water | 5 | 50,000 | $9.6 \times 10^{-11}$ |
| 16 | A/C (3:1) | 0.88 | 0.5% | NaSO$_4$, KCl, CaSO$_4$, MgSO$_4$ | 5 | 29,000 | $4.2 \times 10^{-9}$ |
| 17 | A/C (3:1) | 0.88 | 3.0% | NaSO$_4$, KCl, CaSO$_4$, MgSO$_4$ | 5 | 29,000 | $1.2 \times 10^{-9}$ |

TABLE 1-continued

Rigid wall Hydraulic conductivity data of the various Anionic Polymer (A)/Cationic Polymer (C) Combinations vs. various aggressive leachates.

| Example # | Polymer Combination | Dry Clay/Polymer Loading (lbs/ft$^2$) | Polymer Loading (wt. %) | Permeant | Hydraulic Head (m) | Electrical Conductivity of the Permeant (µs/cm) | Hydraulic Conductivity (cm/sec) |
|---|---|---|---|---|---|---|---|
| 18 | A/C (3:1) | 0.88 | 0.5% | NaSO$_4$, KCl, CaSO$_4$, MgSO$_4$ | 5 | 29,000 | $7.1 \times 10^{-9}$ |
| 19 | A/C (3:1) | 0.88 | 3.0% | NaSO$_4$, KCl, CaSO$_4$, MgSO$_4$ | 5 | 29,000 | $1.5 \times 10^{-9}$ |
| 20 | A/C (3:1) | 0.88 | 3.0% | NaSO$_4$, KCl, CaSO$_4$, MgSO$_4$ | 5 | 29,000 | $1.4 \times 10^{-9}$ |

Examples 21-24

Needle-punched samples (Examples 21-24) were prepared and tested as using the rigid wall permeameter method. Example Comp. 21 is a comparative example showing the performance of a clay-only system. Their ability to seal around a penetration was examined. In these cases, a nail was inserted through the sample, which spanned the thickness of the clay layer in the test cell. As shown in Table 2 below, the clay/polymer systems in accordance with the disclosure beneficially demonstrated the ability to seal around the penetration and retain low hydraulic conductivity, which is indicative that the system is an effective barrier to the salt water permeant. Significantly lower hydraulic conductivities were achieved as compared to the clay-only system of Comp. 21.

TABLE 2

Rigid wall hydraulic conductivity data with defect of the various Anionic Polymer (A)/Cationic Polymer (C) Combinations vs. various aggressive leachates.

| Example # | Polymer Combination | Dry Clay Loading (lbs/ft$^2$) | Polymer Loading (wt. %) | Permeant | Hydraulic Head (m) | Electrical Conductivity of the Permeant (µs/cm) | Hydraulic Conductivity (cm/sec) |
|---|---|---|---|---|---|---|---|
| Comp. 21 | | 0.88 | 0% | NaCl | 5 | 50,000 | $7.7 \times 10^{-7}$ |
| 22 | A/C (3:1) | 0.88 | 1.0% | NaCl | 5 | 50,000 | $2.9 \times 10^{-9}$ |
| 23 | A/C (3:1) | 0.88 | 1.5% | NaCl | 5 | 50,000 | $1.9 \times 10^{-9}$ |
| 24 | A/C (3:1) | 0.88 | 3.0% | NaCl | 5 | 50,000 | $7.3 \times 10^{-10}$ |

Examples 25-45

Needle-punched GCL test specimen were tested using a flexible wall permeameter assessment method (FWPM). The test method followed the ASTM D 6766 standard test protocol for the evaluation of hydraulic properties of geosynthetic clay liners permeated with potentially incompatible liquids. Tests were performed at low effective stress (5 psi) and with the samples in direct contact with the respective leachates (i.e., no benefit of freshwater prehydration in the cell), simulating the most conservative field conditions. The testing was done using 4" diameter GCL test specimen with a hydraulic gradient range of 200-280. The cell pressure, which provided the confining pressure on the specimen, was 80 PSI and the inflow and outflow pressures were 77 and 75 PSI respectively. Table 3 and 4 below describes the various leachates used to test the hydraulic conductivity of the GCL samples. The leachates were either actual samples taken from mining sites (Table 3) or coal combustion sites (Table 4) or prepared as synthetic analogous of expected leachates from the various industrial processes. The coal combustion products (CCP) were categorized into various types. The chemistry of the leachates were evaluated by inductively coupled plasma (ICP) using an IRIS Intrepid unit by Thermo Elemental. Some major anions were determined using a DR/4000 Hach spectrophotometer by the various colorimeter testing methods. The pH of the leachates were determined using an Oakton Ion 700 instrument. The electrical conductivity of the leachates were determined using a Mettler-Toledo SevenGo Pro meter. The molar concentrations of the various ions detected were used to estimate the ionic strength (I) expressed as mol/L and the ratio of monovalent to divalent cations (RMD) expressed as $(mol/L)^{0.5}$.

TABLE 3

Mining Leachate Analysis.

| Permeant Type | Bauxite Mine (Synthetic Dilute) | Bauxite Mine (Synthetic Conc.) | Molybdenum Mine (Site A) | Molybdenum Mine (Site B) |
|---|---|---|---|---|
| Permeant pH | 12.6 | 12.3 | 7.5 | 5.0 |
| Permeant Electrical Conductivity (µS/cm) | 54,000 | 102,000 | 4,890 | 3,750 |
| RMD | 1.32 | 1.32 | 0.02 | 0.02 |
| I | 2.12 | 2.12 | 0.14 | 0.14 |

TABLE 3-continued

Mining Leachate Analysis.

| Permeant Type | Bauxite Mine (Synthetic Dilute) | Bauxite Mine (Synthetic Conc.) | Molybdenum Mine (Site A) | Molybdenum Mine (Site B) |
|---|---|---|---|---|
| Ion | Conc (mg/L) | Conc (mg/L) | Conc (mg/L) | Conc (mg/L) |
| Na | 15,314 | 22,300 | 75 | 52 |
| Al | 6,913 | 9,290 | 3.9 | 36 |
| Cd |  |  | 0.004 | 0.05 |
| Pb |  |  |  | 0.005 |
| Mn |  |  | 0.40 | 140 |
| Mg |  | 0.10 | 386 | 275 |
| Fe |  | 0.05 |  | 0.09 |
| Zn |  |  |  | 31 |
| Ni |  |  |  | 2.0 |
| Ca |  | 0.10 | 703 | 699 |
| K |  | 141 | 16 | 50 |
| S of SxOy-2 | 1,082 | 0.06 | 2,862 | 3,291 |
| Cl— | 607 | 102,051 | 435 | 102 |
| F− | 181 |  |  |  |
| $CO_3^{-2}$ | 5,097 |  |  |  |

TABLE 4

Coal Combustion Product Leachate Analysis.

| Permeant Type | CCP (Synthetic) | CCP (Site C) | CCP (Site D) | CCP (Site E) | CCP (Site F) |
|---|---|---|---|---|---|
| Permeant pH | 8.4 | 7.8 | 9.5 | 6.2 | 9.1 |
| Permeant Electrical Conductivity (μS/cm) | 56,000 | 4,160 | 4,500 | 13,830 | 14,280 |
| RMD | 1.67 | 0.11 | 1.54 | 0.08 | 0.25 |
| I | 1.04 | 0.03 | 0.01 | 0.47 | 0.22 |
| Ion | Conc (mg/L) | Conc (mg/L) | Conc (mg/L) | Conc (mg/L) | Conc (mg/L) |
| Na | 14,530 | 274 | 416 | 345 | 912 |
| Al | 2.3 | 2.2 | 3.7 | 19 |  |
| Ba |  | 0.05 | 2.4 |  |  |
| B |  |  |  |  |  |
| Se |  | 0.06 |  | 0.39 |  |
| Cd |  |  |  |  |  |
| Pb |  | 0.01 |  |  |  |
| As |  | 0.003 |  |  |  |
| Mn |  |  |  |  |  |
| Mg | 347 | 46 |  | 164 | 11.1 |
| Fe | 14,000 | 0.01 |  | 0.5612 |  |
| Cr |  | 0.02 | 0.33 | 0.06 |  |
| Zn |  | 0.01 | 0.42 | 0.24 |  |
| Ni |  |  |  | 0.24 |  |
| Ca | 415 | 413 |  | 6,656 | 1,990 |
| K | 485 | 19 | 73 | 659 | 645 |
| Cu | 1000 |  |  |  |  |
| Mo |  |  |  |  |  |
| Sb |  |  |  |  |  |
| Zr |  |  |  |  |  |
| P of PO4— |  |  |  | 0.367 |  |
| S of SxOy-2 | 10964 | — | — | 2,550 | 1,480 |
| Cl— | 17564 | — | — | 3,910 | 4,340 |
| F− |  |  |  |  |  |
| $CO_3^{-2}$ |  |  |  |  |  |

| Permeant Type | FGD (Synthetic) | FGD (Site G) | FGD (Site H) | Fly Ash (Site I) | Trona (Synthetic) |
|---|---|---|---|---|---|
| Permeant pH | 10.4 | 7.5 | 4.9 | 9.8 | 10.9 |
| Permeant Electrical Conductivity (μS/cm) | 13,620 | 5,560 | 4,900 | 10,640 | 84,000 |
| RMD | 0.06 | 0.02 | 0.00 | 0.63 | 38.46 |
| I | 0.19 | 0.14 | 1.04 | 0.17 | 0.97 |
| Ion | Conc (mg/L) | Conc (mg/L) | Conc (mg/L) | Conc (mg/L) | Conc (mg/L) |
| Na | 354 | 45 | 15 | 2,007 | 22318 |
| Al |  | 2.7 | 4.2 | 17 |  |
| Ba |  | 0.041 |  | 1.8 |  |
| B |  | 8.3 |  |  |  |
| Se |  | 2.2 |  |  |  |

TABLE 4-continued

Coal Combustion Product Leachate Analysis.

| | | | | | |
|---|---|---|---|---|---|
| Cd | | 0.001 | 0.003 | | |
| Pb | | | | 0.082 | |
| As | | 0.003 | | | |
| Mn | | 2.8 | 4.5 | | |
| Mg | | 399 | 83 | 0.05 | |
| Fe | | 0.13 | 0.5182 | 0.004 | |
| Cr | | 0.16 | 0.0485 | 0.861 | |
| Zn | | 0.34 | 260 | 0.03 | |
| Ni | | 0.10 | 0.034 | 0.01 | |
| Ca | 2395 | 520 | 843 | 786 | 26 |
| K | | 34 | 6.1 | 84 | |
| Cu | | 0.02 | | 0.03 | |
| Mo | | 0.04 | | | |
| Sb | | 0.02 | | | |
| Zr | | 0.003 | | | |
| P of PO4— | | 0.497 | 0.54 | 0.352 | |
| S of SxOy-2 | — | 1,194 | 2,021 | — | — |
| Cl— | 4780 | | | | 34486 |
| F$^-$ | | | — | 5,667 | |
| CO$_3^{-2}$ | | | | | |

The GCL samples were prepared by applying the clay/additive mixture between two polypropylene geotextiles and needle-punching them using a loom, as described above. The samples included a granular clay known as CG-50, which is a natural Wyoming sodium bentonite. The needle punching density was approximately 12,000 strikes/ft$^2$. The clay/additive mixtures were prepared by weighing their respective components in a small bucket and mixing them together by hand. In one example, a small molecule betaine was used. The clay/additive mixtures were applied to the base fabric equivalent to ~0.9 to 1.5 lbs/ft$^2$ (4.39 to 6.59 kg/m$^2$). Once the clay/additive blends were evenly distributed over the base fabric, they were hydrated with fresh water (using a fine spray) at a ratio of 28 parts water per 100 parts of blend. The hydrated blends were covered with a 6 oz nonwoven polypropylene cap fabric and sent through the loom. Table 5 provides the results of the testing, the hydraulic conductivity information for the FWPM testing with the various leachates along with the additive loading contents. Example 27 was allowed to desiccate at ambient conditions for one month prior to testing to allow for the removal of the water of hydration during the manufacturing process. FIGS. 7 to 11 show the hydraulic conductivity as a function of testing time for select examples in various classes of leachates.

TABLE 5

Flexible wall hydraulic conductivity data with defect of the various vs. various aggressive leachates.

| Example | Additive System | Total Estimated Dry Loading in GCL (lbs/ft$^2$) | Additive Content (wt %) in Total Blend | Permeant Type | Permeant pH | Permeant Electrical Conductivity (μS/cm) | Hydraulic Conductivity (cm/sec) |
|---|---|---|---|---|---|---|---|
| 25 | Betaine A/C (1:1) | 1.10 | 15 | CCP (Synthetic) | 8.4 | 56,000 | 7.58E−10 |
| 26 | A/C (3:1) | 1.61 | 4 | CCP (Synthetic) | 7.27 | 54,300 | 1.60E−09 |
| 27 | A/C (3:1) Dried | 1.45 | 4 | CCP (Synthetic) | 9.70 | 54,000 | 5.83E−10 |
| 28 | A/C (3:1) | 1.05 | 2 | CCP (Site C) | 7.75 | 4,160 | 9.38E−10 |
| 29 | A/C (3:1) | 1.18 | 2 | CCP (Site D) | 9.5 | 4,500 | 9.17E−10 |
| 30 | A/C (3:1) | 1.35 | 4 | CCP (Site E) | 6.2 | 13,830 | 9.16E−10 |
| 31 | A/C (3:1) | 1.71 | 4 | CCP (Site F) | 9.12 | 14,280 | 5.21E−10 |
| 32 | A/C (3:1) | 1.53 | 4 | CCP (Site F) | 9.12 | 14,280 | 7.34E−10 |
| 33 | A/C (3:1) | 1.28 | 2 | FGD (Synthetic) | 10.35 | 13,620 | 8.37E−09 |
| 34 | A/C (3:1) | 1.35 | 2 | FGD (Synthetic) | 10.35 | 13,620 | 2.61E−07 |
| 35 | A/C (3:1) | 1.20 | 2 | FGD (Synthetic) | 10.35 | 13,620 | 2.25E−06 |
| 36 | A/C (3:1) | 1.01 | 4 | FGD (Synthetic) | 10.35 | 13,620 | 8.69E−07 |

TABLE 5-continued

Flexible wall hydraulic conductivity data with defect of the various vs. various aggressive leachates.

| Example | Additive System | Total Estimated Dry Loading in GCL (lbs/ft$^2$) | Additive Content (wt %) in Total Blend | Permeant Type | Permeant pH | Permeant Electrical Conductivity (µS/cm) | Hydraulic Conductivity (cm/sec) |
|---|---|---|---|---|---|---|---|
| 37 | A/C (3:1) | 0.94 | 4 | FGD (Synthetic) | 10.35 | 13,620 | 1.77E−06 |
| 38 | A/C (3:1) | 1.05 | 2 | FGD (Site G) | 7.5 | 5,560 | 4.72E−08 |
| 39 | A/C (3:1) | 1.31 | 4 | FGD (Site G) | 7.5 | 5,560 | 7.23E−10 |
| 40 | A/C (3:1) | 1.06 | 2 | FGD (Site H) | 4.9 | 4,900 | 8.11E−10 |
| 41 | A/C (3:1) | 1.02 | 1 | Fly Ash (Site I) | 9.77 | 10,640 | 8.02E−07 |
| 42 | A/C (3:1) | 1.38 | 4 | Fly Ash (Site I) | 9.77 | 10,640 | 2.88E−10 |
| 43 | A/C (3:1) | 0.97 | 4 | Trona (Synthetic) | 10.87 | 84,000 | 1.72E−07 |
| 44 | A/C (3:1) | 1.20 | 4 | Bauxite (Synthetic Dilute) | 12.58 | 54,000 | 4.82E−10 |
| 45 | A/C (3:1) | 1.19 | 4 | Bauxite (Synthetic Conc) | 12.27 | 102,000 | 5.96E−07 |

Figure 7:
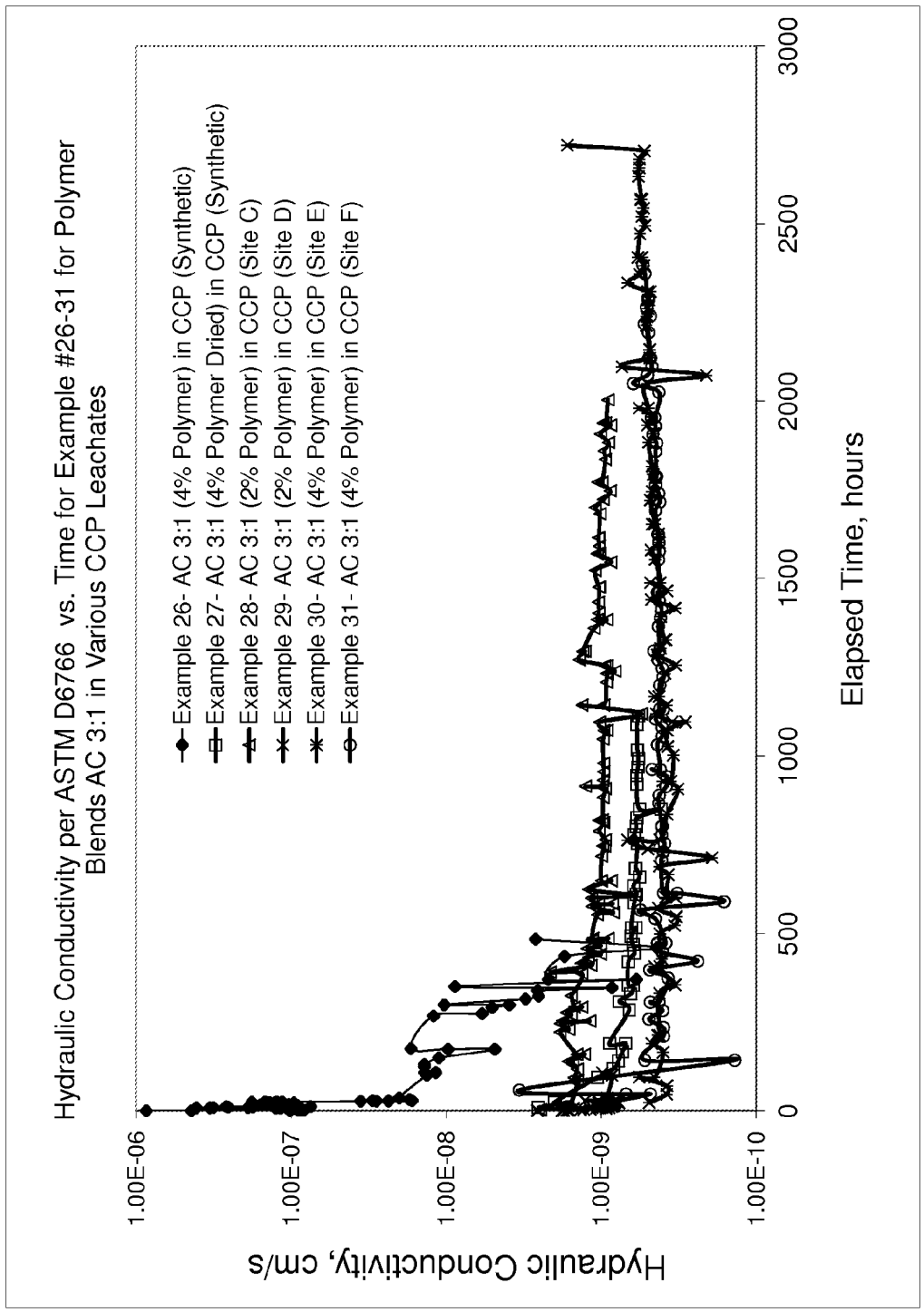
FIG. 7 is a graph showing the hydraulic conductivity of clay/polymer systems in accordance with embodiments of the disclosure as a function of time for various coal combustion product leachates.
Figure 8:
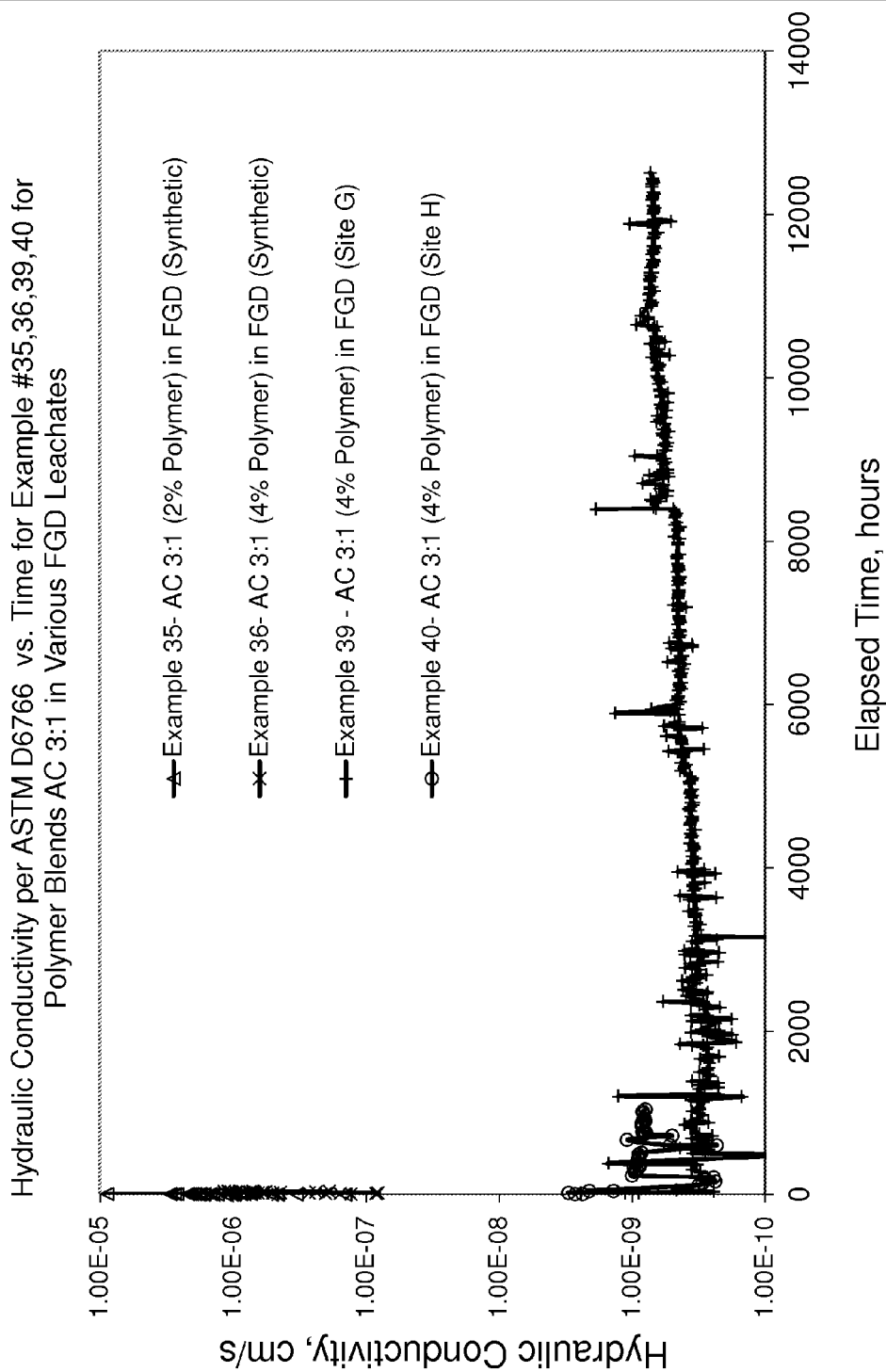
FIG. 8 is a graph showing the hydraulic conductivity of clay/polymer systems in accordance with embodiments of the disclosure as a function of time for various flue gas desulfurization leachates.
Figure 9:
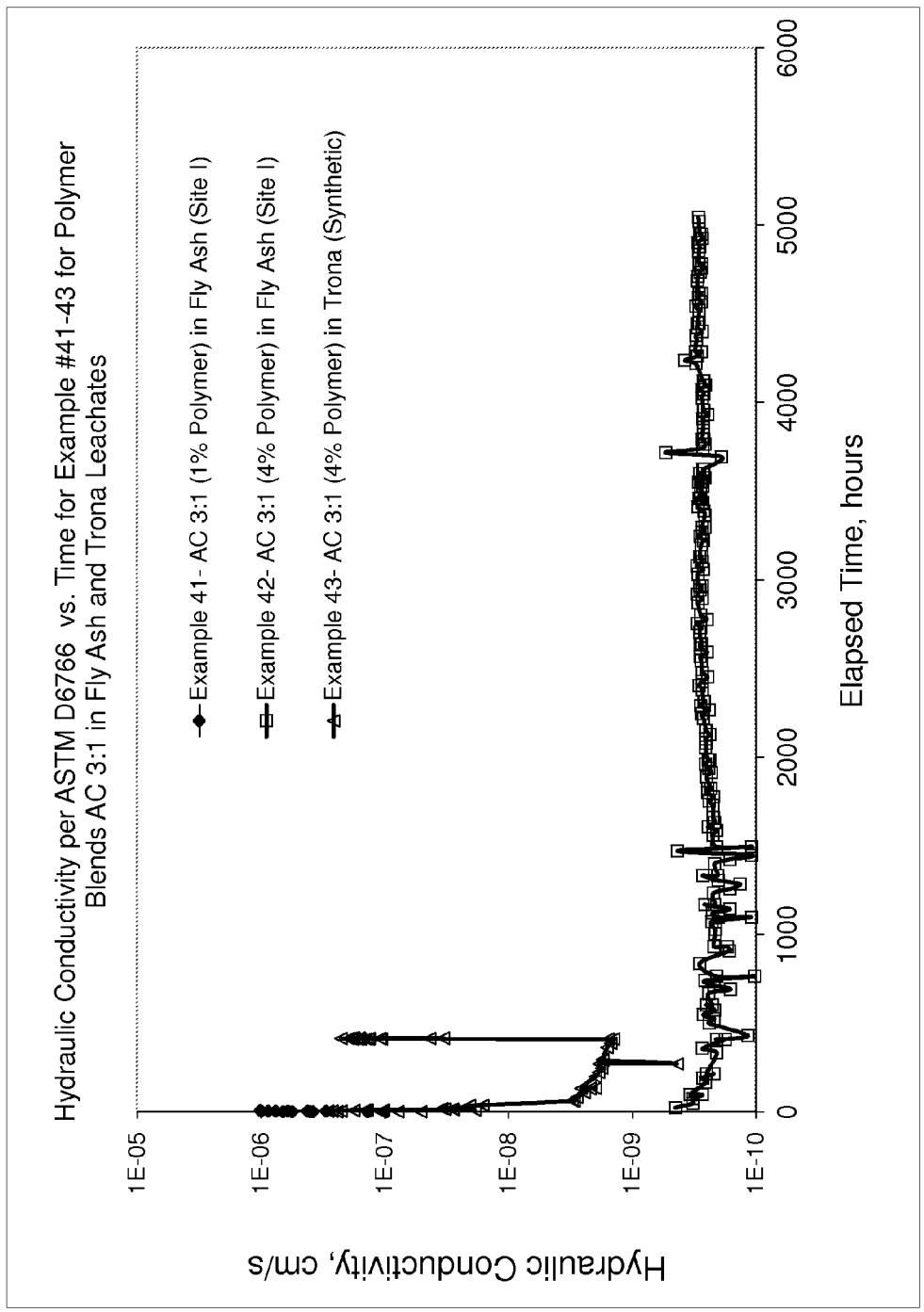
FIG. 9 is a graph showing the hydraulic conductivity of clay/polymer systems in accordance with embodiments of the disclosure as a function of time for various fly ash and Trona leachates.
Figure 10:
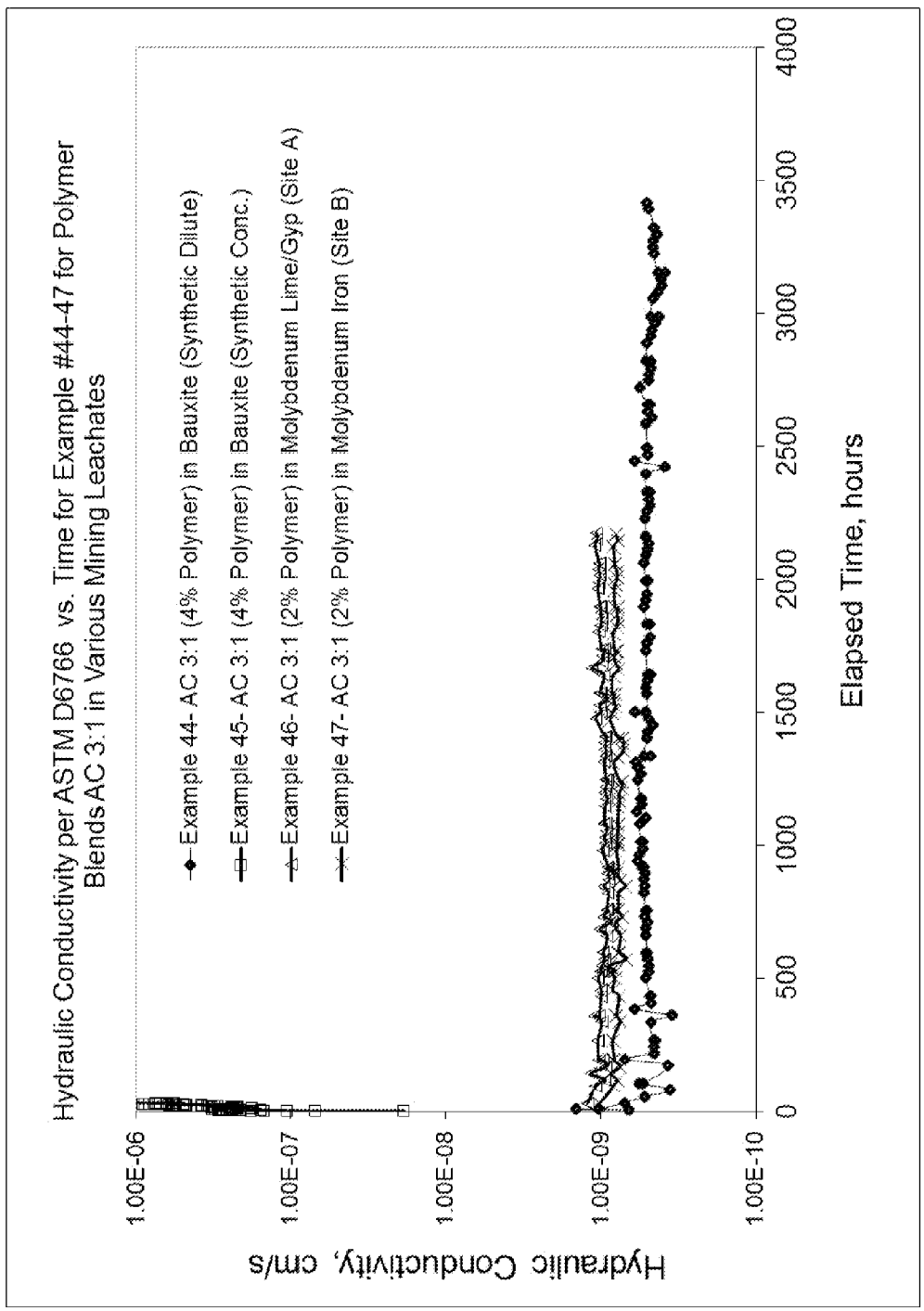
FIG. 10 is a graph showing the hydraulic conductivity of clay/polymer systems in accordance with embodiments of the disclosure as a function of time for various mining leachates.
Figure 11:
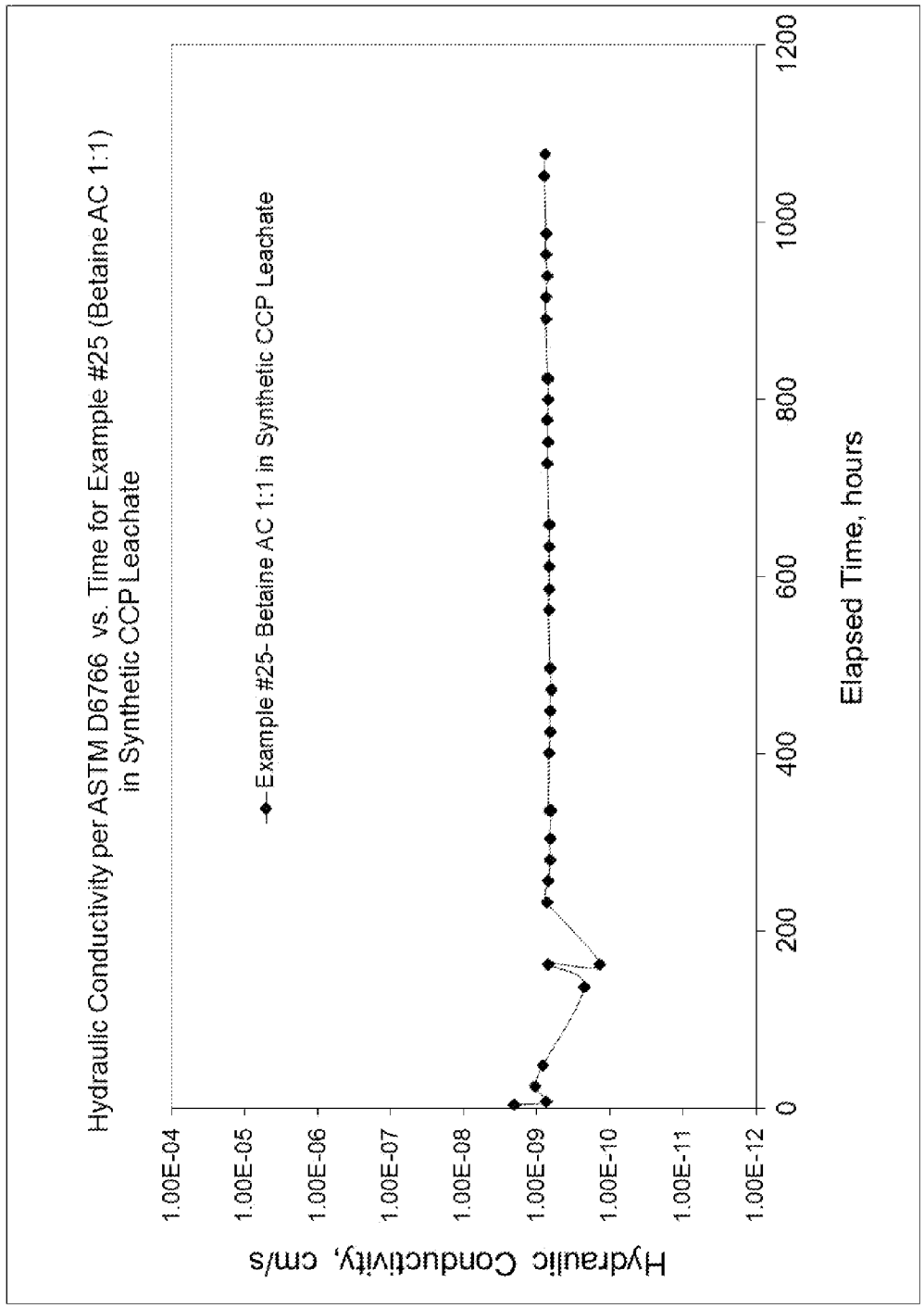
FIG. 11 is a graph showing the hydraulic conductivity of a clay/polymer system containing betaine in accordance with embodiments of the disclosure as a function time for a synthetic coal combustion product leachate.

FIG. 7 graphically illustrates the hydraulic conductivity of examples 26 to 31, which were tested in various CCP leachates, as a function time. FIG. 8 graphically illustrates the hydraulic conductivity of examples 35, 36, 39, and 40, which were tested in various FGD leachates, as a function of time. FIG. 9 graphically illustrates the hydraulic conductivity of examples 41 to 43, which were tested in fly ash or trona leachates, as a function of time. FIG. 10 graphically illustrates the hydraulic conductivity of examples 44 to 47, which were tested in various mining leachates as a function of time. FIG. 11 graphically illustrates the hydraulic conductivity of example 25, which was tested in synthetic CCP leachate, as a function of time.

Examples 25 to 45 illustrate how a given leachate can vary in chemistry depending upon the site from which it was generated. Variance in leachate chemistry can affect the performance of the clay/polymer systems in accordance with the embodiments of the disclosure. For example, it was found that FGD leachate samples having high electrical conductivities above 10,000 µS/cm may result in higher hydraulic conductivities. It is believed that improved (reduced) hydraulic conductivities can be achieved under such conditions by increasing the polymer loading in the system and/or increasing the mass per unit area in the GCL. For other leachates, such as Bauxite leachates, the systems in accordance with the disclosure were found to perform well despite high electrical conductivies of the system. Without intending to be bound by theory, it is believed that the presence of a higher concentration of chloride ions in combination with high pH may result in a more aggressive environment for the clay/polymer systems, requiring increased polymer concentrations and/or as increased mass per unit area in the GCL to provide desired hydraulic conductivities. The clay/polymer systems were found to perform well, even at lower loading concentrations of about 4 wt % in leachates having a high concentration of sulfate ions (greater than 1000 ppm) in addition to higher pH conditions.

While various embodiments have been described above, the disclosure is not intended to be limited thereto. Variations can be made to the disclosed embodiments that are still within the scope of the appended aspects.

The invention claimed is:
1. A composition capable of increased impermeability against the passage of ionic liquids therethrough comprising clay mixed with a polymer component,
   the polymer component being
      a combination of about 0.2 to 20 wt. % anionic polymer and about 0.2 to 20 wt. % cationic polymer;
   or
   one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
   or
   a combination of
      at least one cationic polymer, at least one anionic polymer, or at least one cationic polymer and at least one anionic polymer,
      and
      one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
   wherein a negative to positive charge balance of the polymer component is about 2:4 to about 1:1.
2. The composition of claim 1, wherein the polymer component has a charge balance of about 1:1.
3. A composition capable of increased impermeability against the passage of ionic liquids therethrough comprising clay mixed with a polymer component, the polymer component being
> a combination of about 0.2 to 20 wt. % anionic polymer and about 0.2 to 20 wt. % cationic polymer;
> or
> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
> or
> a combination of
>> at least one cationic polymer, at least one anionic polymer, or at least one cationic polymer and at least one anionic polymer,
>> and
>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
> wherein the polymer component has a charge of about 0.5 meq/gm to about 20 meq/gm.

4. The composition of claim 3, wherein the polymer component has a charge of about 1.0 meq/gm to about 15 meq/gm.

5. The composition of claim 4, wherein the polymer component has a charge of about 1.0 meq/gm to about 10 meq/gm.

6. A composition capable of increased impermeability against the passage of ionic liquids therethrough comprising clay mixed with a polymer component,
> the polymer component being
>> a combination of about 0.2 to 20 wt. % anionic polymer and about 0.2 to 20 wt. % cationic polymer;
>> or
>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
>> or
>> a combination of
>>> at least one cationic polymer, at least one anionic polymer, or at least one cationic polymer and at least one anionic polymer,
>>> and
>>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
> wherein one of the polymers of the polymer component is anionic acrylamide copolymer in the form of a powder or granulate.

7. A composition capable of increased impermeability against the passage of ionic liquids therethrough comprising clay mixed with a polymer component,
> the polymer component being
>> a combination of about 0.2 to 20 wt. % anionic polymer and about 0.2 to 20 wt. % cationic polymer;
>> or
>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
>> or
>> a combination of
>>> at least one cationic polymer, at least one anionic polymer, or at least one cationic polymer and at least one anionic polymer,
>>> and
>>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
> wherein the polymer component comprises a cationic polymer, and the cationic polymer comprises acrylamide and at least one compound of general Formula III $$H_2C=\underset{O}{\overset{R^1}{C}}-Z^1-Y \qquad (III)$$

wherein
$R^1$ stands for hydrogen or methyl,
$Z^1$ stands for O, NH or $NR^4$, wherein $R^4$ stands for alkyl with 1 to 4 carbon atoms, and
Y stands for one of the groups $$-Y^0-N\begin{matrix}Y^2\\ \\Y^3\end{matrix} \quad \text{or} \quad -Y^1-\overset{\oplus}{N}-Y^5 \quad Z^\ominus ,$$
$$\phantom{-Y^1-\overset{\oplus}{N}-}Y^6$$

wherein
$Y^0$ and $Y^1$ stand for alkylene with 2 to 6 carbon atoms, optionally substituted with hydroxy groups,
$Y^2, Y^3, Y^4, Y^5$, and $Y^6$, independently of each other, stand for alkyl with 1 to 6 carbon atoms, and
Z– stands for halogen, acetate or methyl sulfate.

8. A composition capable of increased impermeability against the passage of ionic liquids therethrough comprising clay mixed with a polymer component,
> the polymer component being
>> a combination of about 0.2 to 20 wt. % anionic polymer and about 0.2 to 20 wt. % cationic polymer;
>> or
>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;
>> or
>> a combination of
>>> at least one cationic polymer, at least one anionic polymer, or at least one cationic polymer and at least one anionic polymer,
>>> and
>>> one or more charged polymer(s), each charged polymer comprising a combination of anionic and cationic charge sites, where the charged polymer(s) are present at an amount such that the constituent monomer(s) comprising charge sites comprises 0.2 to 20 wt. % of the composition;

wherein the polymer component comprises a cationic polymer, and the cationic polymer comprises acrylamide and at least one compound of general Formula IV

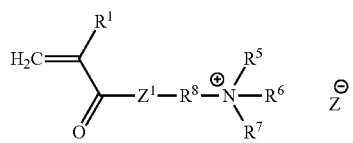

wherein $Z^1$ stands for O, NH or $NR^4$, wherein $R^4$ stands for hydrogen or methyl, $R^1$ stands for hydrogen or methyl, $R^5$ and $R^6$ stand, independently of each other, for alkyl with 1 to 6 carbon atoms, $R^7$ stands for alkyl, aryl and/or aralkyl with 8 to 32 carbon atoms, $R^8$ stands for alkylene with 1 to 6 carbon atoms, and Z– stands for halogen, pseudohalide ions, methyl sulfate or acetate;

or general Formula V

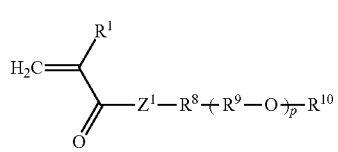

wherein $Z^1$ stands for O, NH or $NR^4$, wherein $R^4$ stands for alkyl with 1 to 4 carbon atoms, $R^1$ stands for hydrogen or methyl, $R^8$ stands for alkylene with 1 to 6 carbon atoms, $R^9$ stands for alkylene with 2 to 6 carbon atoms, and $R^{10}$ stands for hydrogen, alkyl, aryl, and/or aralkyl with 8 to 32 carbon atoms, and p stands for an integer between 1 and 50.

9. The composition of claim 1, wherein the clay comprises a bentonite clay that swells when contacted with water.

10. An article of manufacture useful as a barrier against the passage of ionic liquids therethrough comprising a fabric containing the composition of claim 1.

11. The article of manufacture of claim 10, wherein the article comprises two fabrics needle-punched together surrounding an intermediate layer of the composition.

12. The article of manufacture of claim 10, wherein the loading of the composition is about 0.5 lbs/ft² to about 1.6 lbs/ft².

13. The article of manufacture of claim 11, wherein the composition is disposed adjacent to fabric fibers throughout at least 20% of a depth of at least one of the fabrics.

14. The article of claim 11, wherein at least one of the fabrics is a non-woven fabric.

15. The article of claim 11, wherein both fabrics are non-woven.

16. A method of providing an essentially ionic liquid-impermeable barrier below an ionic liquid to prevent the ionic liquid from reaching ground water supplies below said barrier comprising disposing the article of manufacture of claim 10 under and in contact with an ionic liquid such that the article of manufacture has an impermeability to said ionic liquid with a maximum hydraulic conductivity of $1 \times 10^{-7}$ cm/sec.

17. A method of providing an essentially ionic liquid-impermeable barrier below an ionic liquid to prevent the ionic liquid from reaching ground water supplies below said barrier comprising disposing the article of manufacture of claim 10 under and in contact with an ionic liquid such that the article of manufacture has an impermeability to said ionic liquid with a maximum hydraulic conductivity of $1 \times 10^{-8}$ cm/sec.

18. A method of providing an essentially ionic liquid-impermeable barrier below an ionic liquid to prevent the ionic liquid from reaching ground water supplies below said barrier comprising disposing the article of manufacture of claim 10 under and in contact with an ionic liquid such that the article of manufacture has an impermeability to said ionic liquid with a maximum hydraulic conductivity of $5 \times 10^{-9}$ cm/sec.

19. The method of claim 16, wherein the ionic liquid has a pH of about 5 to about 13.

20. The method of claim 16, wherein the ionic liquid has a pH of about 9 to about 13.

21. The method of claim 16, wherein the ionic liquid is a mineral ore leachate.

22. The method of claim 21, wherein the ionic liquid is bauxite ore leachate.

23. The method of claim 16, wherein the ionic liquid is coal combustion product leachate.

24. The method of claim 16, wherein the ionic liquid is a flue gas desulfurization residual leachate.

25. The method of claim 16, wherein the ionic liquid is a leachate having a concentration of sulfate ions greater than 1000 mg/L.

26. A method of containing a leachate, comprising lining a waste containment cell with the article in accordance with claim 10 and filling the waste containment cell with a waste product for generating the leachate, wherein the article absorbs moisture from the leachate and the composition forms a gel.

27. The method of claim 26, wherein the article absorbs moisture such that the composition has a moisture content of about 60 parts to about 120 parts per 100 parts of composition.

28. The method of claim 27, wherein the article absorbs moisture such that the composition has a moisture content of about 70 parts to about 90 parts per 100 parts of composition.

29. A leachate containment system, comprising:
a bottom surface;
the article of claim 10 disposed adjacent to the bottom surface;
a leachate disposed on the article, wherein the article has an impermeability to the leachate with a maximum hydraulic conductivity of $1 \times 10^{-8}$ cm/sec.

30. The leachate containment system of claim 29, wherein the composition of the article forms a gel upon absorption of moisture from the leachate to a moisture content of 70 parts to 90 parts per 100 parts of composition.

* * * * *